US008321087B2

(12) United States Patent
Hayashi et al.

(10) Patent No.: US 8,321,087 B2
(45) Date of Patent: Nov. 27, 2012

(54) DAMPING FORCE CONTROL APPARATUS

(75) Inventors: Taisuke Hayashi, Toyota (JP); Yuichi Mizuta, Suntou-gun (JP); Yanqing Liu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/682,869

(22) PCT Filed: Mar. 31, 2009

(86) PCT No.: PCT/JP2009/057023
§ 371 (c)(1),
(2), (4) Date: Apr. 13, 2010

(87) PCT Pub. No.: WO2010/113329
PCT Pub. Date: Oct. 7, 2010

(65) Prior Publication Data
US 2012/0010780 A1    Jan. 12, 2012

(51) Int. Cl.
*B60G 17/06* (2006.01)
(52) U.S. Cl. ............... 701/37; 180/902; 280/5.515
(58) Field of Classification Search ............ 701/37
See application file for complete search history.

(56) References Cited

U.S. PATENT DOCUMENTS

| | | | | |
|---|---|---|---|---|
| 4,065,154 A * | 12/1977 | Glaze | ............... | 280/5.513 |
| 4,921,272 A * | 5/1990 | Ivers | ............... | 188/280 |
| 4,936,425 A * | 6/1990 | Boone et al. | ............... | 188/266.1 |
| 5,203,584 A | 4/1993 | Butsuen et al. | | |
| 5,410,482 A * | 4/1995 | Kimura et al. | ............... | 701/37 |
| 5,490,068 A * | 2/1996 | Shimizu et al. | ............... | 701/38 |
| 5,671,142 A * | 9/1997 | Tatarazako | ............... | 701/37 |
| 5,862,894 A * | 1/1999 | Boichot et al. | ............... | 188/280 |
| 5,944,763 A * | 8/1999 | Iwasaki | ............... | 701/37 |
| 6,092,011 A * | 7/2000 | Hiramoto | ............... | 701/37 |
| 7,822,519 B2 * | 10/2010 | Masamura | ............... | 701/37 |
| 2005/0240326 A1 * | 10/2005 | Lauwerys et al. | ............... | 701/38 |

(Continued)

FOREIGN PATENT DOCUMENTS

DE    41 12 603 A1    10/1991

(Continued)

OTHER PUBLICATIONS

Aug. 4, 2009 Search Report issued in International Patent Application No. PCT/JP2009/057023 (with translation).

(Continued)

*Primary Examiner* — Shelley Chen
(74) *Attorney, Agent, or Firm* — Oliff & Berridge, PLC

(57) ABSTRACT

A control mode for a damping force characteristic is set to be a variable control when a product of the sum $x_b'$ of sprung member speeds and a sprung-member-unsprung-member-relative-speed $x_s'$ is positive. Accordingly, when the vibration in a middle/high frequency range is not being input to a suspension apparatus, an operation of a variable throttle mechanism is controlled so that a step number representing the damping force characteristic of a damper varies with a vibration state of a sprung member HA based on a Nonlinear $H_\infty$ control theory. When the product of $x_b'$ and $x_s'$ is negative, the control mode is set to be an operation prohibiting control. When the vibration in the middle/high frequency range is input to the suspension apparatus, operation of the variable throttle mechanism is prohibited, and suppresses an increase in the operation frequency or in the operation amount of the variable throttle mechanism.

16 Claims, 10 Drawing Sheets

U.S. PATENT DOCUMENTS

2008/0004771 A1 * 1/2008 Masamura ............... 701/37

FOREIGN PATENT DOCUMENTS

| JP | U-63-112112 | 7/1988 |
| JP | A-4-2517 | 1/1992 |
| JP | A-6-106944 | 4/1994 |
| JP | 06247117 A * | 9/1994 |
| JP | A-6-247117 | 9/1994 |
| JP | A-10-264632 | 10/1998 |
| JP | A-2002-2529 | 1/2002 |

OTHER PUBLICATIONS

Aug. 21, 2012 Japanese Office Action issued in Japanese Application No. 2010-512455 (with partial translation).

* cited by examiner

DAMPING FORCE CONTROL APPARATUS

TECHNICAL FIELD

The present invention relates to a damping force control apparatus for controlling a damping force characteristic of a damper used for a vehicle suspension apparatus and the like.

BACKGROUND ART

A vehicle suspension apparatus supporting a sprung member such as a vehicle body comprises a spring and a damper, which are interposed/disposed between the sprung member and an unsprung member. A damping force control apparatus for variably controlling a damping force characteristic of the damper is known. Such a damping force control apparatus variably controls the damping force characteristic of the damper in response to a vibration state/condition of the sprung member on the basis of, for example, a skyhook control theory or a Nonlinear H .INF. ($H_\infty$) control theory.

Japanese Patent Application Laid-Open (kokai) No. Hei 6-247117 discloses a suspension apparatus comprising a damper having a structure configured in such a manner that, when either one of "a damping force characteristic when the damper is expanded/uncompressed" or "a damping force characteristic when the damper is compressed" is variably controlled, the rest of those is fixed to (or kept unchanged at) a low damping force characteristic. Damping force control means for controlling the damping force characteristic of the damper of this suspension apparatus variably controls the damping force characteristic of the damper as follows. The damping force characteristic is variably controlled in such a manner that the damping force characteristic is proportional to a value obtained by dividing a speed of a sprung-member in a vertical direction (a sprung-member-speed) by a sprung-member-unsprung-member-relative-speed (a vibration speed of the suspension apparatus), which is a relative speed between the sprung-member-speed and a speed of the unsprung-member in the vertical direction, when a product of the sprung-member-speed and the sprung-member-unsprung-member-relative-speed is positive. Further, the damping force characteristic of the damper is variably controlled in such a manner that the damping force characteristic is proportional to the sprung-member-speed, when the product of the sprung-member-speed and the sprung-member-unsprung-member-relative-speed is negative.

DISCLOSURE OF THE INVENTION

When a vibration in a low frequency range in proximity to a resonance frequency of the sprung member (e.g. 1 Hz) is applied/input to the suspension apparatus, a comfortability in riding (ride comfort) of a vehicle is improved by variably controlling the damping force characteristic of the damper according to the skyhook control theory or the Nonlinear $H_\infty$ control theory.

Meanwhile, when a vibration in a middle/high frequency range higher than the resonance frequency of the sprung member, especially a vibration in the middle frequency range (e.g., 4 to 8 Hz) between the resonance frequency of the sprung member and a resonance frequency of the unsprung member (e.g., 11 Hz), is applied to the suspension apparatus, the comfortability in riding is degraded, because a transmissibility of the vibration transmitted to the sprung member increases as the damping force generated by the damper increases. Accordingly, in the conventional apparatus, the damping force characteristic is fixed to a low damping force characteristic which generates a relatively low damping force (preferably, the lowest damping force), when the vibration in the middle/high frequency range is applied to the suspension system. Such a low damping force fixing control can avoid/suppress the degradation of the riding comfortability of the vehicle.

When a control mode of the damping force characteristic is changed from the variable control to the low damping force fixing control and vice versa, damping force characteristic changing means, which comprises an actuator and a valve for changing the damping force characteristic, operates to change the control mode. Accordingly, if the control mode changes more frequently, a frequency of operation of the damping force characteristic changing means increases. Further, there may be a case where the damping force characteristic is variably controlled within high damping force characteristics which generate a relatively high damping force under the variable control, in order to improve the riding comfortability of the vehicle. In such a case, when the control mode is changed, the damping force characteristic changing means needs to change the damping force characteristic greatly from the high damping force characteristic to the low damping force characteristic, or vice versa. As a result, an operation amount of the damping force characteristic changing means increases. The increase in the operation frequency of or in the operation amount of the damping force characteristic changing means may degrade its durability.

The present invention is made to cope with the problems described above. An object of the present invention is to provide a damping force control apparatus which can suppress the increase in the operation frequency of or in the operation amount of the damping force characteristic changing means, when the control mode of the damping force characteristic changes, especially when the control mode changes on the basis of whether or not the vibration in the middle/high frequency range is being applied/input to the suspension apparatus.

The present invention provides a damping force control apparatus, which is applied to a plurality of suspension apparatuses interposed between a sprung member and an unsprung member to support the sprung member, each having a spring and a damper, for controlling a damping force characteristic of each of the dampers comprising:

damping force characteristic changing means for changing the damping force characteristic of each of the dampers;

sprung-member-unsprung-member-relative-speed obtaining means for obtaining sprung-member-unsprung-member-relative-speeds, each sprung-member-unsprung-member-relative-speed representing a vibration speed of each of the suspension apparatuses in a vertical direction;

sum of sprung member speeds obtaining means for obtaining a sum of sprung member speeds which is a summation of each speed of the sprung member in the vertical direction at a position at which the sprung member is supported by each of the plurality of suspension apparatuses;

positive-negative determining means for determining whether a product of the sum of sprung member speeds and each of the sprung-member-unsprung-member-relative-velocities is positive or negative;

damping force characteristic control means for controlling an operation of the damping force characteristic changing means in such a manner that the damping force characteristic of each of the damper is changed according to a vibration state of the sprung member when it is determined that each of the products is positive by the positive-negative determining means; and operation prohibiting means for prohibiting an operation of the damping force characteristic changing means when it is determined that each of the products is negative by the positive-negative determining means.

In this case, it is preferable that the damping force characteristic control means comprises:

required damping force calculation means for calculating each of required damping force, as a control target damping force, to be generated by each of the dampers of the suspension apparatus based on a Nonlinear $H_\infty$ control theory and damping force characteristic determining means for determining a damping force characteristic of each of the dampers based on each of the required damping force calculated by the required damping force calculation means, and for outputting to the damping force characteristic changing means a signal corresponding to the determined damping force characteristic.

According to the present invention, the positive-negative determining means determines whether each of the products is positive or negative. The product is calculated by multiplying the summation of each of the speeds of the sprung member in the vertical direction at positions at which the sprung member is supported by the plurality of suspension apparatuses by the vibration speed of the suspension apparatus The vibration speed is the sprung-member-unsprung-member-relative-speed represents a difference speed between a speed of the sprung member connected to one side of each of the suspension apparatuses in the vertical direction and a speed of the unsprung member connected to the other side of each of the suspension apparatuses in the vertical direction. When the product is positive, an operation of the damping force characteristic changing means for changing the damping force characteristic of the damper of the suspension apparatus, which is vibrating at the sprung-member-unsprung-member-relative-speed used when calculate the product, is controlled in such a manner that the damping force characteristic of the damper changes in accordance with the vibration state of the sprung member. The damping force characteristic is thus variably controlled. On the other hand, when the product is negative, the operation of the damping force characteristic changing means for changing the damping force characteristic of the damper of the suspension apparatus which is vibrating at the sprung-member-unsprung-member-relative-speed used when calculate the product is prohibited. While the product is negative, the damping force characteristic is controlled so as to remain unchanged from "the damping force which is a damping force immediately before the operation of the damping force characteristic is prohibited". In the present specification, this control is referred to as an operation prohibiting control.

Consequently, when the control mode of the damping force characteristic is changed from the variable control to the operation prohibiting control based on the determination result of the positive-negative determining means, the damping force characteristic is fixed to "the damping force characteristic immediately before the control mode is changed". Accordingly, the damping force characteristic changing means does not operate when the control mode is changed. This suppresses the increase in the operation frequency of or in the operation amount of the damping force characteristic changing means, and the durability of the damping force characteristic changing means is therefore improved.

Further, in the case that the control mode is changed from the variable control to the operation prohibiting control, and then, the control mode is changed from the operation prohibiting control to the variable control, that is, in the case the variable control is resumed, the damping force characteristic at the time the variable control is resumed is equal to the damping force characteristic which was variably controlled immediately (just) before the operation prohibiting control. That is, the damping force characteristic at the previous variable control is taken over (remains unchanged) by resumed variable control via the operation prohibiting control which is interposed between the resumed variable control and the previous variable control. It is likely that the damping force characteristic immediately after the variable control is resumed is close to the target damping force characteristic under the resumed variable control. Consequently, it is possible to suppress the increase in the operation amount of the damping force characteristic changing means during a period from a timing when the variable control is resumed to a timing when the damping force characteristic reaches the desired characteristic. Moreover, since the damping force characteristic can be quickly set to the desired damping force characteristic after the variable control is resumed, a delay of the control is short. Furthermore, an insufficiency of the damping force due to the delay of the control can be suppressed.

In addition, the required damping force calculated based on the Nonlinear $H_\infty$ control theory is greatly affected by the speed of the sprung member at the positions at which the plurality of the suspension apparatuses support the sprung member. That is, it is highly likely that whether the sum of sprung member speeds is positive or negative coincides with whether the required damping force is positive or negative. Accordingly, it is likely that the determination result by the positive-negative determining means coincides with whether the product of the required damping force and the sprung-member-unsprung-member-relative-speed is positive or negative. Further, when the product of the required damping force and the sprung-member-unsprung-member-relative-speed is negative, it is likely that the vibration in the middle/high frequency is being applied to the suspension apparatus. In view of the above, whether or not the vibration in the middle/high frequency is being applied to the suspension apparatus can be determined based on the determination result by the positive-negative determining means. According to the present invention, it is inferred that the vibration in the middle/high frequency is being applied to the suspension apparatus when the determination result by the positive-negative determining means is negative, i.e., when the product of the sum of sprung member speeds and the sprung-member-unsprung-member-relative-speed is negative. Further, while the product is negative, the control mode of the damping force characteristic is set to be the operation prohibiting control to prohibit the operation of the damping force characteristic changing means. Accordingly, the present invention can suppress the increase in the operation frequency of or in the operation amount of the damping force characteristic changing means while the middle/high frequency is being applied to the suspension apparatus. This improves the durability of the damping force characteristic changing means.

Moreover, since the operation of the damping force characteristic changing means is prohibited when it is inferred that the vibration in the middle/high frequency is being applied to the suspension apparatus, it is avoided that the damping force characteristic is changed to be higher. Accordingly, it is avoided for the comfortability in riding of the vehicle to be further degraded.

When the product of the sum of sprung member speeds and the sprung-member-unsprung-member-relative-speed is positive, it is unlikely that the vibration in the middle/high frequency is being applied to the suspension apparatus. The comfortability in riding of the vehicle is therefore improved by variably controlling the damping force characteristic based on the calculated required damping force in accordance with the Nonlinear $H_\infty$ control theory during this period.

In the present invention, a relation between a direction of the sum of sprung member speeds and a direction of the sprung-member-unsprung-member-relative-speed are defined in advance. In the case that the sprung member speed is defined to be a positive speed when the sprung member is moving upwardly, and the sprung member speed is defined to be a negative speed when the sprung member is moving downwardly, the sprung-member-unsprung-member-relative-speed is determined to be a positive relative speed when a distance between the sprung member and the unsprung member is decreasing (compression direction), and the sprung-member-unsprung-member-relative-speed is determined to be a negative relative speed when the distance between the sprung member and the unsprung member is increasing (expansion direction). To the contrary, in the case that the sprung member speed is defined to be a positive speed when the sprung member is moving downwardly, and the sprung member speed is defined to be a negative speed when the sprung member is moving upwardly, the sprung-member-unsprung-member-relative-speed is determined to be a positive relative speed when a distance between the sprung member and the unsprung member is increasing (expansion direction), and the sprung-member-unsprung-member-relative-speed is determined to be a negative relative speed when the distance between the sprung member and the unsprung member is decreasing (compression direction).

It is also preferable that four suspension apparatuses are connected to front-left portion, front-right portion, rear-left portion, and rear-right portion of the sprung member. Each of the four of the suspension apparatuses may preferably connected to each of the unsprung members, each connected to one of four wheels of the vehicle.

It is also preferable that the operation prohibiting means prohibit the operation of the damping force characteristic changing means by determining a target characteristic of the damping force characteristic of the damper to a target characteristic which is the same as one that was determined by the operation prohibiting means in a previous process. That is, the operation prohibiting means may control the damping force characteristic of the damper in such a manner that the damping force characteristic coincides with the target characteristic which is the same as one that was already set at the previous control. The operation of the damping force characteristic changing means is prohibited by such a simple control.

Furthermore, it is preferable that the damping force characteristic changing means comprise:

a valve member, provided to the damper, which operates to change the damping force characteristic; and an actuator, connected to the valve member, which actuates the valve member. According to this construction, the increase in the operation frequency of or in the operation amount of the actuator and the valve member is suppressed. As a result, durability of these members is improved.

Furthermore, it is preferable that the damping force characteristic changing means change the damping force characteristic in a stepwise fashion.

BEST MODE FOR CARRYING OUT THE INVENTION

An embodiment of the present invention will next be described.

Figure 1:
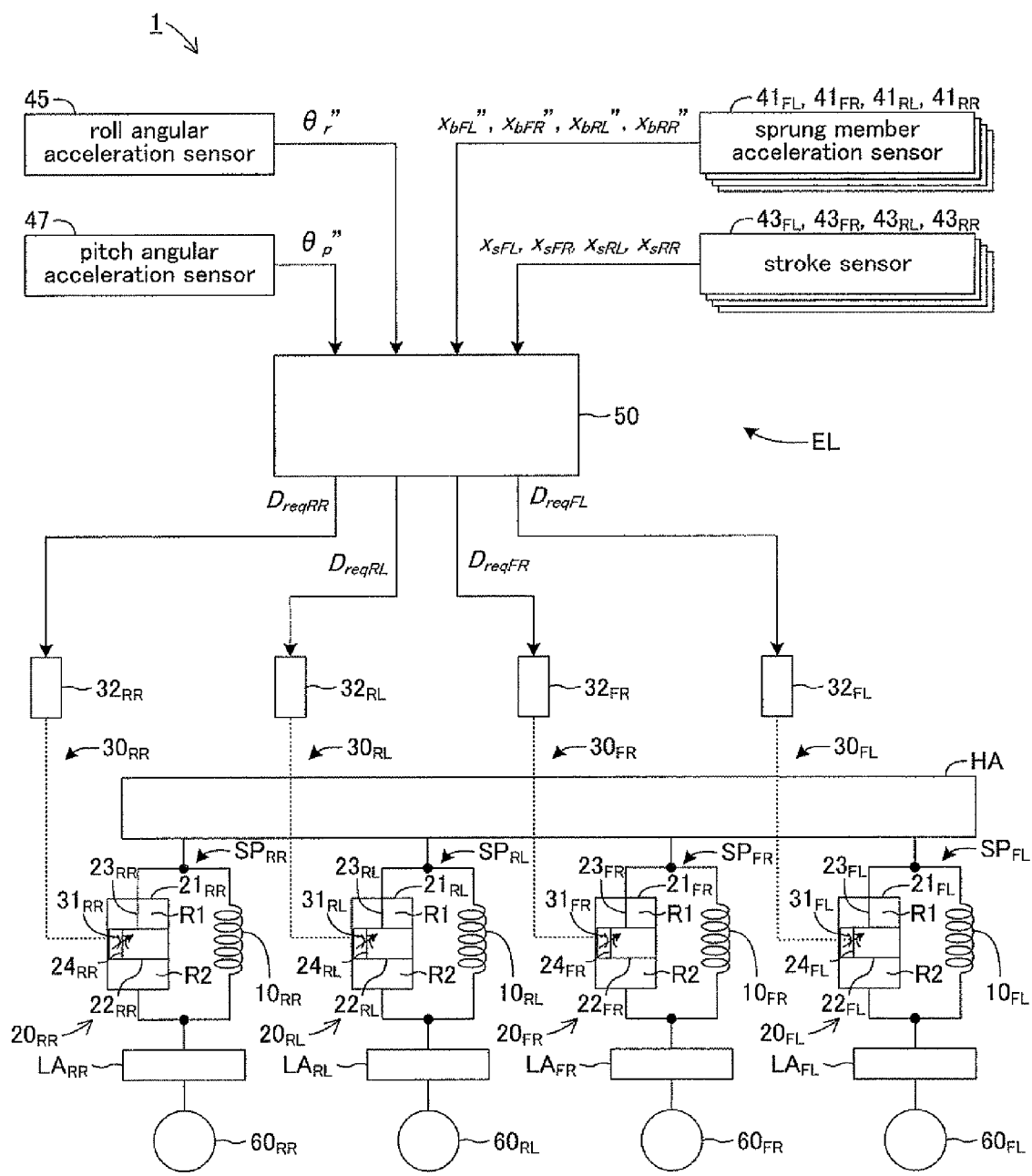
FIG. 1 is an entire schematic diagram of a suspension control apparatus according to a present embodiment.

FIG. 1 shows an entire schematic diagram of a suspension control apparatus according to the present embodiment. As shown in FIG. 1, the suspension control apparatus 1 comprises four suspension apparatuses (suspension mechanisms) $SP_{FL}$, $SP_{FR}$, $SP_{RL}$, $SP_{RR}$ and an electric control device EL. Each of the suspension apparatuses $SP_{FL}$, $SP_{FR}$, $SP_{RL}$, $SP_{RR}$ supports a sprung member HA including a vehicle body and the like. Each of the four suspension apparatuses $SP_{FL}$, $SP_{FR}$, $SP_{RL}$, $SP_{RR}$ has a structure identical to each other. The structure of the suspension apparatus $SP_{FL}$ is therefore described as a representative of these apparatuses.

The suspension apparatus $SP_{FL}$ comprises a spring $10_{FL}$ and a damper $20_{FL}$. The spring $10_{FL}$ and the damper $20_{FL}$ are interposed/disposed in parallel with each other between the sprung member HA and an unsprung member $LA_{FL}$. The suspension apparatus $SP_{FL}$ is, at its upper end side, connected with the sprung member HA of the vehicle. The suspension apparatus $SP_{FL}$ is, at its lower end side, connected with the unsprung member $LA_{FL}$ connected to a front left wheel $60_{FL}$. A knuckle connected to the front left wheel $60_{FL}$, and a lower arm whose one end is connected to the knuckle, and the like correspond to the unsprung member $LA_{FL}$. A lower end side of the suspension apparatus $SP_{FR}$ is connected with the unsprung member $LA_{FR}$ connected to a front right wheel $60_{FR}$. A lower end side of the suspension apparatus $SP_{RL}$ is connected with the unsprung member $LA_{RL}$ connected to a rear left wheel $60_{RL}$. A lower end side of the suspension apparatus $SP_{RR}$ is connected with the unsprung member $LA_{RR}$ connected to a rear right wheel $60_{RR}$.

The damper $20_{FL}$ has a function to provide a resistance to/for a vibration of the sprung member HA relative to the unsprung member $LA_{FL}$ so as to damp the vibration. The damper $20_{FL}$ comprises a cylinder $21_{FL}$, a piston $22_{FL}$, and a piston rod $23_{FL}$. The cylinder $21_{FL}$ is a hollow member which encloses a viscous liquid such as an oil in its inside. The cylinder $21_{FL}$ is, at its lower end, connected with the unsprung member $LA_{FL}$ (e.g., the lower arm). The piston $22_{FL}$ is disposed in the cylinder $21_{FL}$. The piston $22_{FL}$ can move in the cylinder $21_{FL}$ in an axis direction of the cylinder $21_{FL}$. The piston rod $23_{FL}$ is connected with the piston $22_{FL}$ at one end. The piston rod $23_{FL}$ expands upwardly in the axis direction of the cylinder $21_{FL}$ from the one end so as to protrude from an upper end of the cylinder $21_{FL}$. The piston rod $23_{FL}$ is, at the other end, connected with the vehicle body which is the unsprung member HA.

The piston $22_{FL}$ divides an interior of the cylinder $21_{FL}$ into an upper chamber R1 and a lower chamber R2. Communicating passages $24_{FL}$ are formed in the piston $22_{FL}$. Each of the communicating passages $24_{FL}$ communicates between the upper chamber R1 and the lower chamber R2.

In the thus configured damper $20_{FL}$, the piston $22_{FL}$ connected to the sprung member HA through the piston rod $23_{FL}$ is relatively displaced (or moves) along the axis direction in the cylinder $21_{FL}$ connected to the unsprung member $LA_{FL}$, when the sprung member HA vibrates in the vertical direction relative to the unsprung member $LA_{FL}$. The vibration of the sprung member HA is caused, for example, when the vehicle passes through a bump on a road. The relative displacement of the piston $22_{FL}$ causes the viscous fluid to pass through the communication passages $24_{FL}$. The resistance generated when the viscous fluid passes through the communication passages $24_{FL}$ provides the damping force for the vertical vibration. The damping force damps the vibration of the sprung member HA relative to the unsprung member $LA_{FL}$.

A variable throttle mechanism $30_{FL}$ is provided to the suspension apparatus $SP_{FL}$. The variable throttle mechanism $30_{FL}$ corresponds to damping force characteristic changing means of the present invention. The variable throttle mechanism $30_{FL}$ comprises a valve $31_{FL}$ and an actuator $32_{FL}$. The valve $31_{FL}$ is disposed in the communication passages $24_{FL}$. The valve $31_{FL}$ is operated to vary a cross-sectional area of at least a part of the communication passages $24_{FL}$ or to vary the number of communication passages $24_{FL}$ each of which is in a state where it is communicating between the upper chamber R1 and the lower chamber R2. That is, an opening degree OP of the communication passages $24_{FL}$ is changed by the operation of the valve $31_{FL}$. The valve $31_{FL}$ may be a rotary valve installed in the communication passages $24_{FL}$. The opening degree OP may be varied by changing the cross-sectional area of the communication passages $24_{FL}$ or the number of communication passages $24_{FL}$ each of which is in the state where it is communicating between the upper chamber R1 and the lower chamber R2, in accordance with a rotational angle of the rotary valve. The actuator $32_{FL}$ is connected to the valve $31_{FL}$. The valve $31_{FL}$ is operated by an operation of the actuator $32_{FL}$. For example, if the valve $31_{FL}$ is the rotary valve, the actuator $32_{FL}$ may include a motor to rotate the rotary valve.

When the opening degree OP varies according to the operation of the valve $31_{FL}$ caused by the operation of the actuator $32_{FL}$, a magnitude of the resistance generated when the viscous liquid passes through the communication passages $24_{FL}$ varies. As described, the resistance force is the damping force for the vibration. Accordingly, the damping characteristic of the damper $20_{FL}$ changes when the opening degree changes. The damping force characteristic represents a changing characteristic of the magnitude of the damping force with respect to the speed of the piston $22_{FL}$ relative to the cylinder $21_{FL}$, which corresponds to the sprung-member-unsprung-member-relative-speed.

Further, in the present embodiment, the opening degree OP is set/controlled in a stepwise fashion. Accordingly, the damping force characteristic is changed in a stepwise fashion in accordance with a stepwise change in the opening degree OP. The damping force characteristic is represented by a set step number determined by the opening degree OP. That is, each of the damping force characteristics is expressed by the set step number, such as 1st step, 2nd step, . . . , which determines the set opening degree OP. In this case, for example, the set step number representing the damping force characteristic can be defined in such a manner that the damping force increases as the set step number becomes larger. The set step number representing the damping force characteristic is changed by the operation of the variable throttle mechanism $30_{FL}$.

Figure 2:
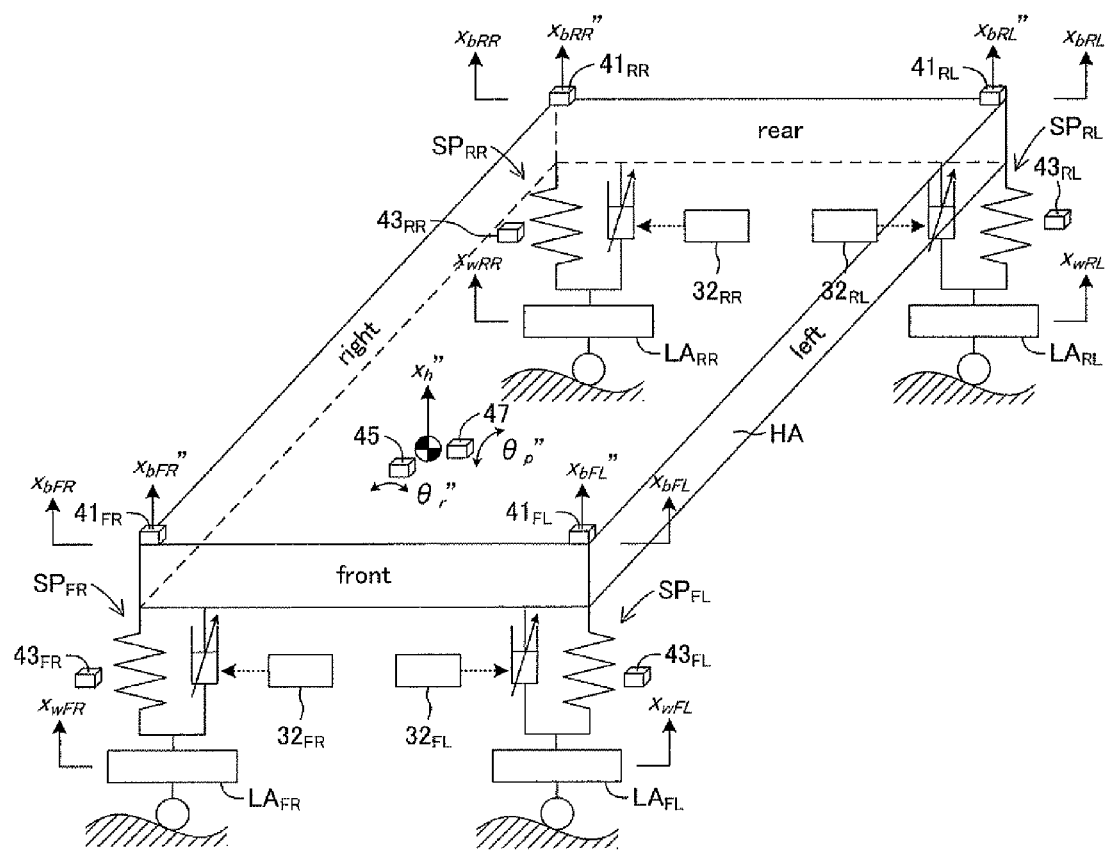
FIG. 2 is a view showing a four-wheel model of a vehicle according to the present embodiment.

FIG. 2 is a view showing a vehicle model (a four-wheel model) in which the four of the suspension apparatuses $SP_{FL}$, $SP_{FR}$, $SP_{RL}$, $SP_{RR}$ are connected to the sprung member HA. As shown in HG. 2, the suspension apparatus $SP_{FL}$ is connected to the sprung member HA at a front left position of the member HA, the suspension apparatus $SP_{FR}$ is connected to the sprung member HA at a front right position of the member HA, the suspension apparatus $SP_{RL}$ is connected to the sprung member HA at a rear left position of the member HA, and the suspension apparatus $SP_{RR}$ is connected to the sprung member HA at a rear right position of the member HA.

The electric control device EL will next be described. As shown in FIG. 1, the electric control device EL comprises sprung member acceleration sensors $41_{FL}$, $41_{FR}$, $41_{RL}$, $41_{RR}$, stroke sensors $43_{FL}$, $43_{FR}$, $43_{RL}$, $43_{RR}$, a roll angular acceleration sensor 45, a pitch angular acceleration sensor 47, and a microcomputer 50.

As shown in FIG. 2, the sprung member acceleration sensor $41_{FL}$ is disposed at the front left position of the sprung member HA, at which the suspension apparatus $SP_{FL}$ supports the sprung member HA, and detects an acceleration $x_{bFL}''$ of the sprung member HA in the vertical direction at the disposed position. The sprung member acceleration sensor $41_{FR}$ is disposed at the front right position of the sprung member HA, at which the suspension apparatus $SP_{FR}$ supports the sprung member HA, and detects an acceleration $x_{bFR}''$ of the sprung member HA in the vertical direction at the disposed position. The sprung member acceleration sensor $41_{RL}$ is disposed at the rear left position of the sprung member HA, at which the suspension apparatus $SP_{RL}$ supports the sprung member HA, and detects an acceleration $x_{bRL}''$ of the sprung member HA in the vertical direction at the disposed position. The sprung member acceleration sensor $41_{RR}$ is disposed at the rear right position of the sprung member HA, at which the suspension apparatus $SP_{RR}$ supports the sprung member HA, and detects an acceleration $x_{bRR}''$ of the sprung member HA in the vertical direction at the disposed position. It should be noted that each of the sprung member acceleration sensors detects an acceleration in an upper direction (an acceleration when the sprung member is accelerated upwardly) as a positive acceleration, and detects an acceleration in a lower direction (an acceleration when the sprung member is accelerated downwardly) as a negative acceleration.

The roll angular acceleration sensor 45 is fixed to the sprung member HA to detect a roll angular acceleration $\theta_r''$ which is an angular acceleration of the sprung member HA at a control target position (e.g., a gravity center of the sprung member HA) in a rolling direction (a direction around a front-rear axis of the vehicle). The pitch angular acceleration sensor 47 is also fixed to the sprung member HA to detect a pitch angular acceleration $\theta_9''$ which is an angular acceleration of the sprung member HA at the control target position (e.g., the gravity center of the sprung member HA) in a pitching direction (a direction around a left-right axis of the vehicle).

Further, the suspension apparatuses $SP_{FL}$, $SP_{FR}$, $SP_{RL}$, and $SP_{RR}$ are provided with the stroke sensors $43_{FL}$, $43_{FR}$, $43_{RL}$, and $43_{RR}$, respectively. The stroke sensor $43_{FL}$ measures a relative displacement (a stroke amount) of the piston $22_{FL}$ disposed in the damper $20_{FL}$ of the suspension apparatus $SP_{FL}$ to thereby detects a sprung-member-unsprung-member-relative-displacement-amount $x_{sFL}(=x_{wFL}-x_{bFL})$. The relative displacement amount $x_{sFL}$ is a difference between a sprung member displacement amount $x_{bFL}$ which is a displacement amount of the sprung member HA at the front left position of the sprung member HA from a reference position in the vertical direction and an unsprung member displacement amount $x_{wFL}$ which is a displacement amount of the unsprung member $LA_{FL}$ connected to the suspension apparatus $SP_F$, from the reference position in the vertical direction. The stroke sensor $43_{FR}$ detects a sprung-member-unsprung-member-relative-displacement amount $x_{sFR}$ ($=x_{wFR}-x_{bFR}$). The relative displacement amount $x_{sFR}$ is a difference between a sprung member displacement amount $x_{bFR}$ which is a displacement amount of the sprung member HA at the front right position of the sprung member HA from a reference position in the vertical direction and an unsprung member displacement amount $x_{wFR}$ which is a displacement amount of the unsprung member $LA_{FR}$ connected to the suspension apparatus $SP_{FR}$ from the reference position in the vertical direction. The stroke sensor $43_{RL}$ detects a sprung-member-unsprung-member-relative-displacement amount $x_{sRL}$ ($=x_{wRL}-x_{bRL}$). The relative displacement amount is a difference between a sprung member displacement amount $x_{bRL}$ which is a displacement amount of the sprung member HA at the rear left position of the sprung member HA from a reference position in the vertical direction and an unsprung member displacement amount $x_{wRL}$ which is a displacement amount of the unsprung member $LA_{RL}$ connected to the suspension apparatus $SP_{RL}$ from the reference position in the vertical direction. The stroke sensor $43_{RR}$ detects a sprung-member-unsprung-member-relative-displacement amount $x_{sRR}$ ($=x_{wRR}-x_{bRR}$). The relative displacement amount $x_{sRR}$ is a difference between a sprung member displacement amount $x_{bRR}$ which is a displacement amount of the sprung member HA at the rear right position of the sprung member HA from a reference position in the vertical direction and an unsprung member displacement amount $x_{wRR}$ which is a displacement amount of the unsprung member $LA_{RR}$ connected to the suspension apparatus $SP_{RR}$ from the reference position in the vertical direction. It should be noted that each of the stroke sensors detects each of the displacement amount as a positive displacement when a distance between the sprung member HA and each of the unsprung members LA decreases from a reference distance, and detects each of the displacement amount as a negative displacement when the distance increases from the reference distance.

As shown in FIG. 1, detected values from the sensors are input to the microcomputer 50. The microcomputer 50 calculates, based on the input values, each of required step numbers $D_{reqFL}$, $D_{reqFR}$, $D_{reqRL}$, and $D_{reqRR}$ which are control target step numbers of the damping force characteristics for the dampers $20_{FL}$, $20_{FR}$, $20_{RL}$, and $20_{RR}$, respectively, and outputs the calculated required step numbers $D_{reqFL}$, $D_{reqFR}$, $D_{reqRL}$, and $D_{reqRR}$ to the actuators $32_{FL}$, $32_{FR}$, $32_{RL}$, and $32_{RR}$, respectively. Each of the actuators $32_{FL}$, $32_{FR}$, $32_{RL}$, and $32_{RR}$ operates so that the step number representing the damping force characteristic of the corresponding damper $20_{FL}$, $20_{FR}$, $20_{RL}$, and $20_{RR}$ coincide with the required step number. The microcomputer 50 and the variable throttle mechanism 30 ($30_{FL}$, $30_{FR}$, $30_{RL}$, and $30_{RR}$) constitute damping force control apparatus of the present invention.

In the thus configured suspension control apparatus 1, an damping force control execution flag is set to ON, when, for example, any one of the detected values by the sprung member acceleration sensors $41_{FL}$, $41_{FR}$, $41_{RL}$, and $41_{RR}$, becomes larger than a predetermined set value (i.e., when it is required to control the damping force of the suspension apparatuses $SP_{FL}$, $SP_{FR}$, $SP_{RL}$, and $SP_{RR}$). The microcomputer 50 executes a program for controlling the damping force, when the damping force control execution flag is set to ON.

Figure 3:
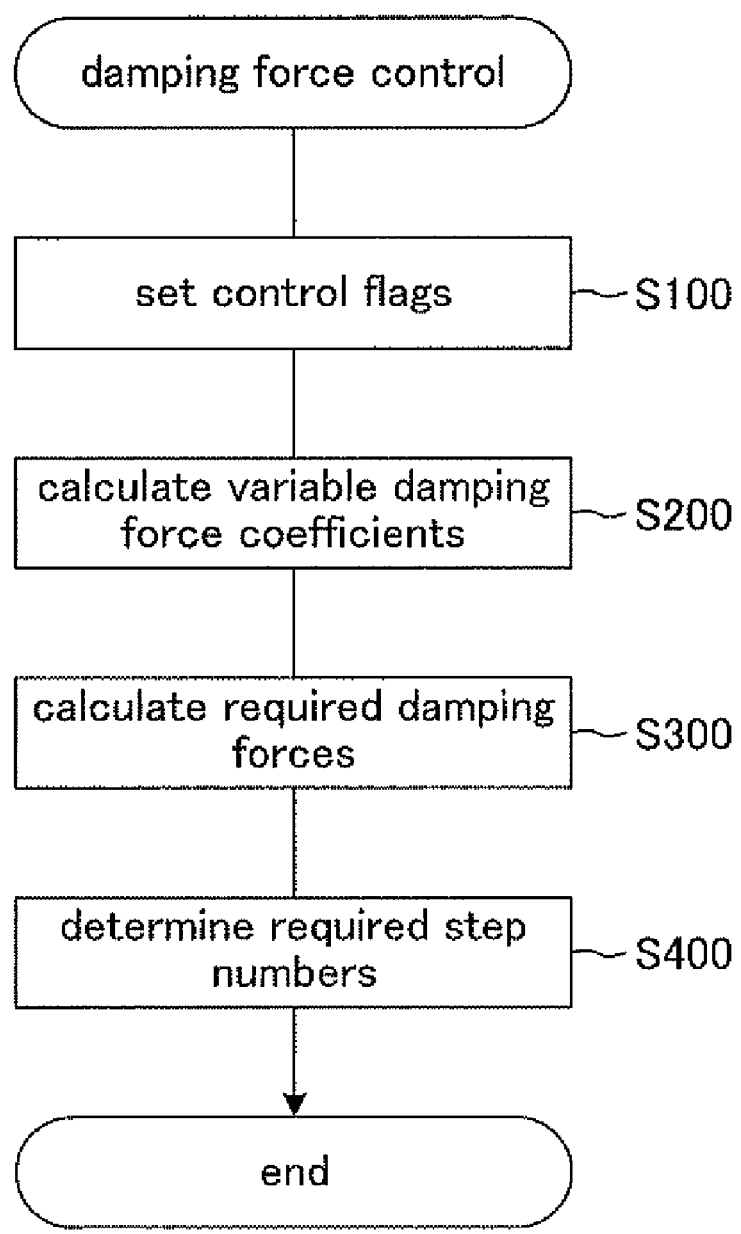
FIG. 3 is a flowchart showing a flow of a damping force control program executed by a microcomputer according to the present embodiment.

FIG. 3 is a flowchart showing a flow of the damping force control program executed by the microcomputer 50. First, the microcomputer 50 sets a control flag at step 100 of FIG. 3, when the damping force control is started (hereinafter, step is abbreviated to S).

Figure 4:
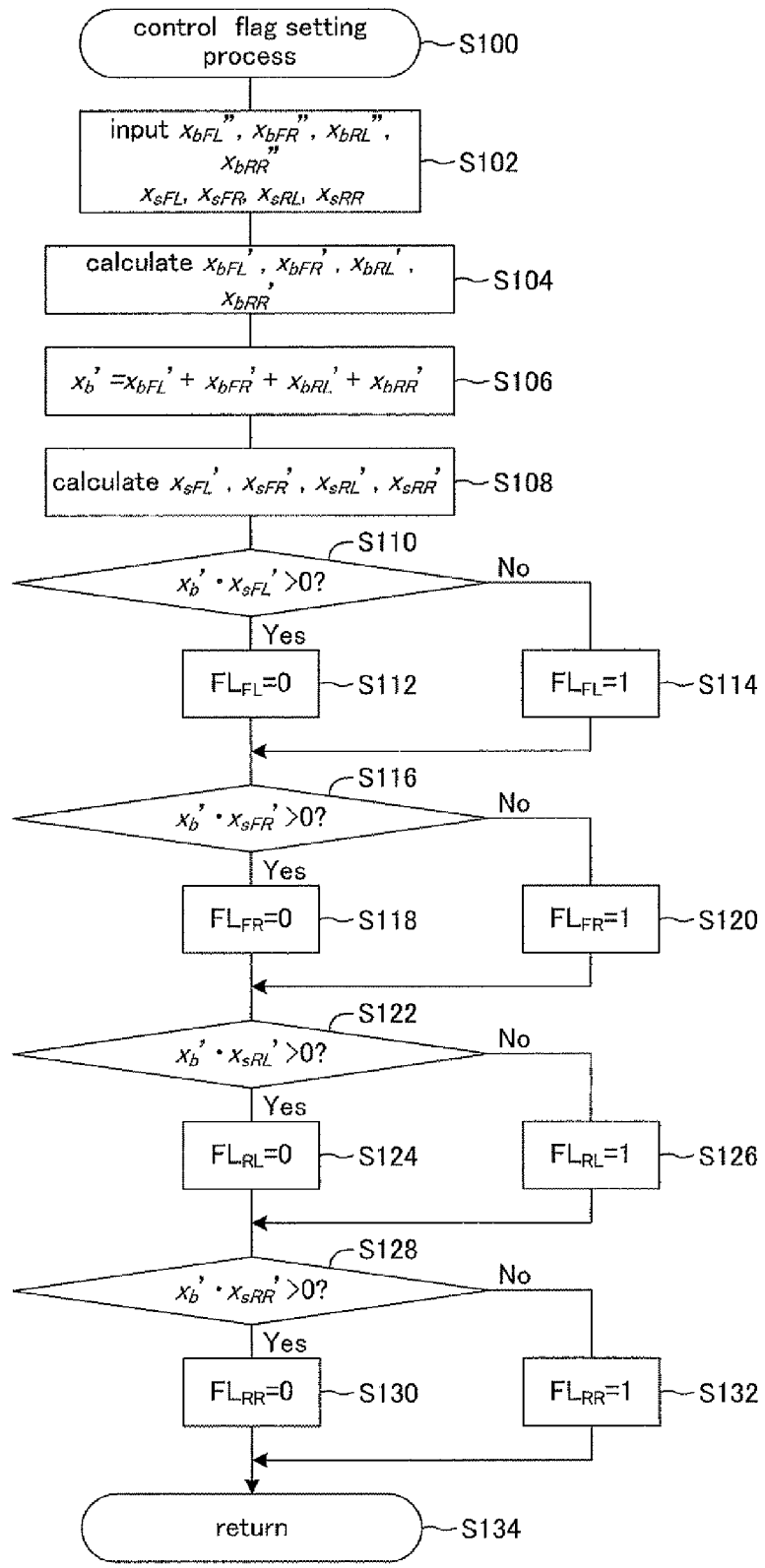
FIG. 4 is a flowchart showing a flow of a control flag setting program executed by the microcomputer according to the present embodiment.

FIG. 4 is a flowchart showing a flow of a control flag setting program executed by the microcomputer 50 at S100. The microcomputer 50 starts the program at S100 of FIG. 4. Subsequently, at S102, the microcomputer 50 inputs the accelerations $x_{bFL}''$, $x_{bFR}''$, $x_{bRL}''$, and $x_{bRR}''$ from the sprung member acceleration sensors $41_{FL}$, $41_{FR}$, $41_{RL}$, and $41_{RR}$, respectively. The microcomputer 50 also inputs the sprung-member-unsprung-member-relative-displacement-amounts $x_{sFL}$, $x_{sFR}$, $x_{sRL}$, and $x_{sRR}$ from the stroke sensors $43_{FL}$, $43_{FR}$, $43_{RL}$, and $43_{RR}$, respectively.

Subsequently, the microcomputer 50, at S104, calculates sprung member speeds $x_{bFL}'$, $x_{bFR}'$, $x_{bRL}'$, and $x_{bRR}'$ by integrating the acceleration $x_{bFL}''$, $x_{bFR}''$ and $x_{bRR}''$ with respect to time, respectively. The sprung member speed $x_{bFR}'$ is a displacement speed of the sprung member HA at the front left position in the vertical direction. The sprung member speed $x_{bFR}'$ is a displacement speed of the sprung member HA at the front right position in the vertical direction. The sprung member speed $x_{bRL}'$ is a displacement speed of the sprung member HA at the rear left position in the vertical direction. The sprung member speed $x_{bRR}'$ is a displacement speed of the sprung member HA at the rear right position in the vertical direction. It should be noted that the microcomputer 50 calculates the sprung speed toward an upper direction as a positive speed, and the sprung speed toward a lower direction as a negative speed.

Subsequently, the microcomputer 50 calculates a sum $x_b'$ of sprung member speeds at S106. The sum $x_b'$ of sprung member speeds is a summation of each of the sprung member speeds $x_{bFL}'$, $x_{bFR}'$, $x_{bRL}'$, and $x_{bRR}'$. At S106, the sum $x_b'$ of sprung member speeds is calculated by summing the sprung member speeds $x_{bFL}'$, $x_{bFR}'$, $x_{bRL}'$, and $x_{bRR}'$. The process of S106 corresponds to sum of sprung member speeds obtaining means of the present invention.

Subsequently, at S108, the microcomputer 50 calculates a sprung-member-unsprung-member-relative-speeds $x_{sFL}'$ ($=x_{wFL}'-x_{bFL}'$), $x_{sFR}'(=x_{wFR}'-x_{bFR}')$, $x_{sRL}'(=x_{wRL}'-x_{bRL}')$, and $x_{sRR}'(=x_{wRR}'-x_{bRR}')$. The relative speed $x_{sFL}'$ is calculated by differentiating the sprung-member-unsprung-member-relative-displacement-amount $x_{sFL}$ with respect to time. The relative speed $x_{sFL}'$ represents a difference between an unsprung member speed $x_{wFL}'$ (a displacement speed of the unsprung member $LA_{FL}$ in the vertical direction) and the sprung member speed $x_{bFL}'$. The relative speed $x_{sFR}'$ is calculated by differentiating the sprung-member-unsprung-member-relative-displacement-amount $x_{sFR}$ with respect to time. The relative speed $x_{sFR}'$ represents a difference between an unsprung member speed $x_{wFR}'$ (a displacement speed of the unsprung member $LA_{FR}$ in the vertical direction) and the sprung member speed $x_{bFR}'$. The relative speed $x_{sRL}'$ is calculated by differentiating the sprung-member-unsprung-member-relative-displacement-amount $x_{sRR}$ with respect to time. The relative speed $x_{sRL}'$ represents a difference between an unsprung member speed $x_{sRL}'$ (a displacement speed of the unsprung member $LA_{RL}$ in the vertical direction) and the sprung member speed $x_{bRL}'$. The relative speed $x_{sRR}'$ is calculated by differentiating the sprung-member-unsprung-member-relative-displacement-amount $x_{sRR}$ with respect to time. The relative speed $x_{sRR}'$ represents a difference between an unsprung member speed $x_{wRR}'$ (a displacement speed of the unsprung member $LA_{RR}$ in the vertical direction) and the sprung member speed $x_{bRR}'$. It should be noted that the microcomputer 50 calculates, as a positive speed, each of the sprung-member-unsprung-member-relative-speeds, when a distance between the sprung member HA and each of the unsprung members $LA_{FL}$, $LA_{FR}$, $LA_{RL}$, and $LA_{RR}$ decreases, that is, when each of the dampers $20_{FL}$, $20_{FR}$, $20_{RL}$, and $20_{RR}$ shrinks, and the microcomputer 50 calculates, as a negative speed, each of the sprung-member-unsprung-member-relative-speeds when the distance between the sprung member HA and each of the unsprung members $LA_{FL}$, $LA_{FR}$, $LA_{RL}$, and $LA_{RR}$ increases, that is, when each of the dampers $20_{FL}$, $20_{FR}$, $20_{RL}$, and $20_{RR}$ expands. The process at S108 corresponds to sprung-member-unsprung-member-relative-speed obtaining means of the present invention.

Subsequently, at S110, the microcomputer 50 determines whether or not a product of the sum $x_b'$ of sprung member speeds and the sprung-member-unsprung-member-relative-speed $x_{sFL}'$ is positive. When the determination result is Yes, the microcomputer 50 proceeds to S112 to set a control flag $FL_{FL}$ to 0. On the other hand, when the determination result at S110 is No, the microcomputer 50 proceeds to S114 to set the control flag $FL_{FL}$ to 1. The microcomputer 50 proceeds to S116 after setting the control flag $FL_{FL}$ at S112 or S114.

At S116, the microcomputer 50 determines whether or not a product of the sum $x_b'$ of sprung member speeds and the sprung-member-unsprung-member-relative-speed $x_{sFR}'$ is positive. When the determination result is Yes, the microcomputer 50 proceeds to S118 to set a control flag $FL_{FR}$ to 0. On the other hand, when the determination result at S116 is No, the microcomputer 50 proceeds to S120 to set the control flag $FL_{FR}$ to 1. The microcomputer 50 proceeds to S122 after setting the control flag $FL_{FR}$ at S118 or S120.

At S122, the microcomputer 50 determines whether or not a product of the sum $x_b'$ of sprung member speeds and the sprung-member-unsprung-member-relative-speed $x_{sRL}'$ is positive. When the determination result is Yes, the microcomputer 50 proceeds to S124 to set a control flag $FL_{RL}$ to 0. On the other hand, when the determination result at S122 is No, the microcomputer 50 proceeds to S126 to set the control flag $FL_{RL}$ to 1. The microcomputer 50 proceeds to S128 after setting the control flag $FL_{FR}$ at S124 or S126.

At S128, the microcomputer 50 determines whether or not a product of the sum $x_b'$ of sprung member speeds and the sprung-member-unsprung-member-relative-speed $x_{sRR}'$ is positive. When the determination result is Yes, the microcomputer 50 proceeds to S130 to set a control flag $FL_{RR}$ to 0. On the other hand, when the determination result at S128 is No, the microcomputer 50 proceeds to S132 to set the control flag $FL_{RR}$ to 1. The microcomputer 50 proceeds to S134 to end the present program after setting the control flag $FL_{RR}$ at S130 or S132.

As described above, by the execution of the control flag setting program, each of the control flags is set to 0 when the corresponding product of the sum $x_b'$ of sprung member speeds and each of the sprung-member-unsprung-member-relative-speeds $x_{sFL}'$, $x_{sFL}'$, $x_{sRL}'$, and $x_{sRR}'$ is positive, and is set to 1 when the corresponding product is negative. As described later, when the product of the sum $x_b'$ of sprung member speeds and each of the sprung-member-unsprung-member-relative-speeds $x_{sFL}'$, $x_{sFR}'$, $x_{sRL}'$, and $x_{sRR}'$ is positive, it is highly likely that the vibration in the middle/high frequency range is not being applied to corresponding each of the suspension apparatuses. On the other hand, when the product of the sum $x_b'$ of sprung member speeds and each of the sprung-member-unsprung-member-relative-speeds $x_{sFL}'$, $x_{sFR}'$, $x_{sRL}'$, and $x_{sRR}'$ is negative, it is highly likely that the vibration in the middle/high frequency range is being applied to corresponding each of the suspension apparatuses. Accordingly, the control flag represents whether or not the vibration in the middle/high frequency range is being input. That is, the control flag is set to 0 when the vibration in the middle/high frequency range is not being input, and the control flag is set to 1 when the vibration in the middle/high frequency range is being input. Processes at S110, S116, S122, and S128 of FIG. 4 correspond to positive-negative determining means of the present invention.

Figure 5:
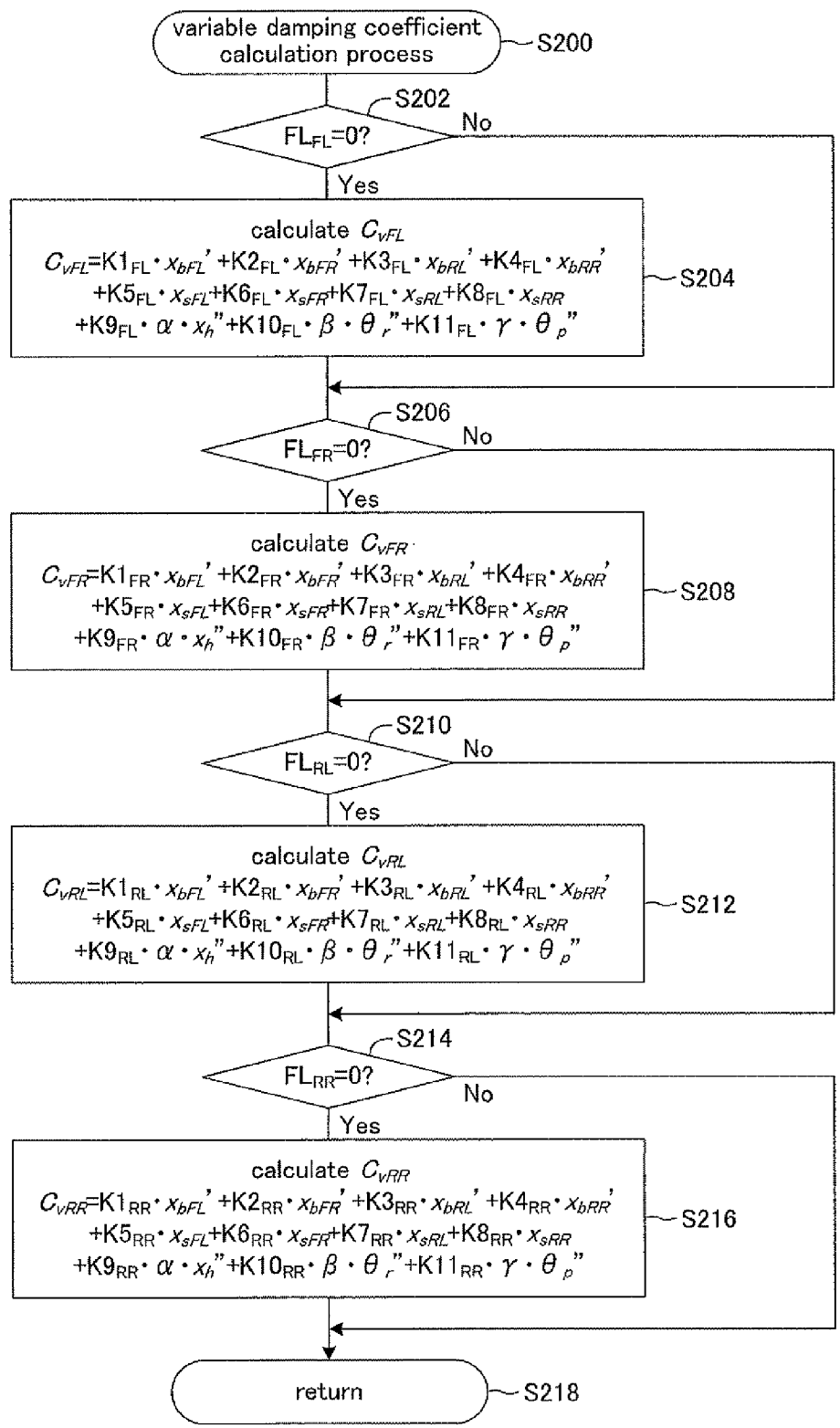
FIG. 5 is a flowchart showing a flow of a variable damping coefficient calculation program executed by the microcomputer according to the present embodiment.

The microcomputer 50 proceeds to S200 of FIG. 3 to calculate variable damping coefficients after setting the control flags at S100 of FIG. 3. FIG. 5 is a flowchart showing a flow of a variable damping coefficient calculation program executed by the microcomputer 50 at S200. The microcomputer 50 starts the program at S200 of FIG. 5. Subsequently, it determines, at S202, whether or not the control flag $FL_{FL}$ is set at 0. The microcomputer 50 proceeds to S204 when the control flag $FL_{FL}$ is set at 0 (S202: Yes). At S204, the microcomputer 50 calculates a variable damping coefficient $C_{vFL}$. The variable damping coefficient $C_{vFL}$ represents a variable component of a required damping coefficient $C_{reqFL}$ for a required damping force $F_{reqFL}$, which is a target damping force to be generated by the damper $20_{FL}$. The variable damping coefficient $C_{vFL}$ is calculated according to the Nonlinear $H_\infty$ control theory.

The Nonlinear $H_\infty$ control theory is one of optimum control theories. In the present embodiment, the four-wheel model of a vehicle shown in FIG. 2 is utilized as a control object model for calculation of the variable damping coefficients. A control system whose state space representation is bilinear is designed based on equations of motion for the set model (an equation of motion of the sprung member HA at the control target position in the vertical direction (an equation of heave motion), an equation of motion of the sprung member HA at the control target position in the roll direction (a roll motion equation), and an equation of motion of the sprung member HA at the control target position in the pitching direction (a pitch motion equation)). The variable damping coefficients are calculated as control inputs by obtaining solutions of Riccati inequality for the designed control model.

When the Nonlinear $H_\infty$ control theory is applied, the variable damping coefficient $C_{vFL}$ is calculated by the following formula.

$$C_{vFL} = K1_{FL} \cdot x_{bFL}' + K2_{FL} \cdot x_{bFR}' + K3_{FL} \cdot x_{bRL}' + K4_{FL} \cdot x_{bRR}' + K5_{FL} \cdot x_{sFL}' + K6_{FL} \cdot x_{sFR}' + K7_{FL} \cdot x_{sRL}' + K8_{FL} \cdot x_{sRR}' + K9_{FL} \cdot \alpha x_h'' + K10_{FL} \cdot \beta \theta_r'' + K11_{FL} \cdot \gamma \theta_p''$$

In the formula above, each of $K1_{FL}$ to $K11_{FL}$ is a gain. Each of $\alpha$, $\beta$, and $\gamma$ is a weight (a weight coefficient) varying depending on the control target position. $x_h''$ is an acceleration of the sprung member HA at the control target position (e.g., the gravity center of the sprung member HA) in the vertical direction (a heave acceleration), and is obtained from each of the sprung member acceleration $x_{bFL}''$, $x_{bFR}''$, $x_{bRL}''$, and $x_{bRR}''$. Each of the variables multiplied by each of the gains represents a vibration state of the sprung member HA.

The microcomputer 50 proceeds to S206 after calculating the variable damping coefficient $C_{vFL}$ at S204. If the microcomputer 50 determines that the control flag $FL_{FL}$ is not set at 0 at S202 (S202: No), that is, when the control flag $FL_{FL}$ is set at 1, it proceeds to S206, skipping S204.

At S206, the microcomputer 50 determines whether or not the control flag $FL_{FR}$ is set at 0. When the control flag $FL_{FR}$ is set at 0 (S206: Yes), the microcomputer 50 proceeds to S208. At S208, the microcomputer 50 calculates the variable damping coefficient $C_{vFR}$ based on the Nonlinear $H_\infty$ control theory. The variable damping coefficient $C_{vFR}$ represents a variable component of a required damping coefficient $C_{reqFR}$ for a required damping force $F_{reqFR}$, which is a target damping force to be generated by the damper $20_{FR}$. The variable damping coefficient $C_{vFR}$ is calculated by the following formula.

$$C_{vFR} = K1_{FR} \cdot x_{bFL}' + K2_{FR} \cdot x_{bFR}' + K3_{FR} \cdot x_{bRL}' + K4_{FR} \cdot x_{bRR}' + K5_{FR} \cdot x_{sFL}' + K6_{FR} \cdot x_{sFR}' + K7_{FR} \cdot x_{sRL}' + K8_{FR} \cdot x_{sRR}' + K9_{FR} \cdot \alpha x_h'' + K10_{FR} \cdot \beta \theta_r'' + K11_{FR} \cdot \gamma \theta_p''$$

In the formula above, each of $K1_{FR}$ to $K11_{FR}$ is a gain.

The microcomputer 50 proceeds to S210 after calculating the variable damping coefficient $C_{vFR}$ at S208. If the microcomputer 50 determines that the control flag $FL_{FR}$ is not set at 0 at S206 (S206: No), that is, when the control flag $FL_{FR}$ is set at 1, it proceeds to S210, skipping S208. At S210, the microcomputer 50 determines whether or not the control flag $FL_{RL}$ is set at 0. When the control flag $FL_{RL}$ is set at 0 (S210: Yes), the microcomputer 50 proceeds to S212. At S212, the microcomputer 50 calculates the variable damping coefficient $C_{vRL}$ based on the Nonlinear $H_\infty$ control theory. The variable damping coefficient $C_{vRL}$ represents a variable component of a required damping coefficient $C_{reqRL}$ for a required damping force $F_{reqRL}$, which is a target damping force to be generated by the damper $20_{RL}$. The variable damping coefficient $C_{vRL}$ is calculated by the following formula.

$$C_{vRL} = K1_{RL} \cdot x_{bFL}' + K2_{RL} \cdot x_{bFR}' + K3_{RL} \cdot x_{bRL}' + K4_{RL} \cdot x_{bRR}' + K5_{RL} \cdot x_{sFL}' + K6_{RL} \cdot x_{sFR}' + K7_{RL} \cdot x_{sRL}' + K8_{RL} \cdot x_{sRR}' + K9_{RL} \cdot \alpha x_h'' + K10_{RL} \cdot \beta \theta_r'' + K11_{RL} \cdot \gamma \theta_p''$$

In the formula above, each of $K1_{RL}$ to $K11_{RL}$ is a gain.

The microcomputer 50 proceeds to S214 after calculating the variable damping coefficient $C_{vRL}$ at S212. If the microcomputer 50 determines that the control flag $FL_{RL}$ is not set at 0 at S210 (S210: No), that is, when the control flag $FL_{RL}$ is set at 1, it proceeds to S214, skipping S212. At S214, the microcomputer 50 determines whether or not the control flag $FL_{RR}$ is set at 0. When the control flag $FL_{RR}$ is set at 0 (S214: Yes), the microcomputer 50 proceeds to S216. At S216, the microcomputer 50 calculates the variable damping coefficient $C_{vRR}$ based on the Nonlinear $H_\infty$ control theory. The variable damping coefficient $C_{vRR}$ represents a variable component of a required damping coefficient $C_{reqRR}$ for a required damping force $F_{reqRR}$, which is a target damping force to be generated by the damper $20_{RR}$. The variable damping coefficient $C_{vRR}$ is calculated by the following formula.

$$C_{vRR} = K1_{RR} \cdot x_{bFL}' + K2_{RR} \cdot x_{bFR}' + K3_{RR} \cdot x_{bRL}' + K4_{RR} \cdot x_{bRR}' + K5_{RR} \cdot x_{sFL}' + K6_{RR} \cdot x_{sFR}' + K7_{RR} \cdot x_{sRL}' + K8_{RR} \cdot x_{sRR}' + K9_{RR} \cdot \alpha x_h'' + K10_{RR} \cdot \beta \theta_r'' + K11_{RR} \cdot \gamma \theta_p''$$

In the formula above, each of $K1_{RR}$ to $K11_{RR}$ is a gain.

The microcomputer 50 proceeds to S218 to end the present program after calculating the variable damping coefficient $C_{vRR}$ at S216. If the microcomputer 50 determines that the control flag $FL_{RR}$ is not set at 0 at S214 (S214: No), that is, when the control flag $FL_{RR}$ is set at 1, it proceeds to S218, skipping S216, to end the present program.

As understood from the flow of the processes described above, each of the variable damping coefficients $C_{vFL}$, $C_{vFR}$, $C_{vRL}$, and $C_{vRR}$ is calculated according to the Nonlinear $H_\infty$ control theory, when each of the corresponding control flags $FL_{RL}$, $FL_{FR}$, $FL_{RL}$, and $FL_{RR}$ is set at 0, that is, when each corresponding product of the sum $x_b'$ of sprung member speeds and each of the sprung-member-unsprung-member-relative-speeds $x_{sFL}'$, $x_{sFR}'$, $x_{sRL}'$, and $x_{sRR}'$ is positive.

Figure 6:
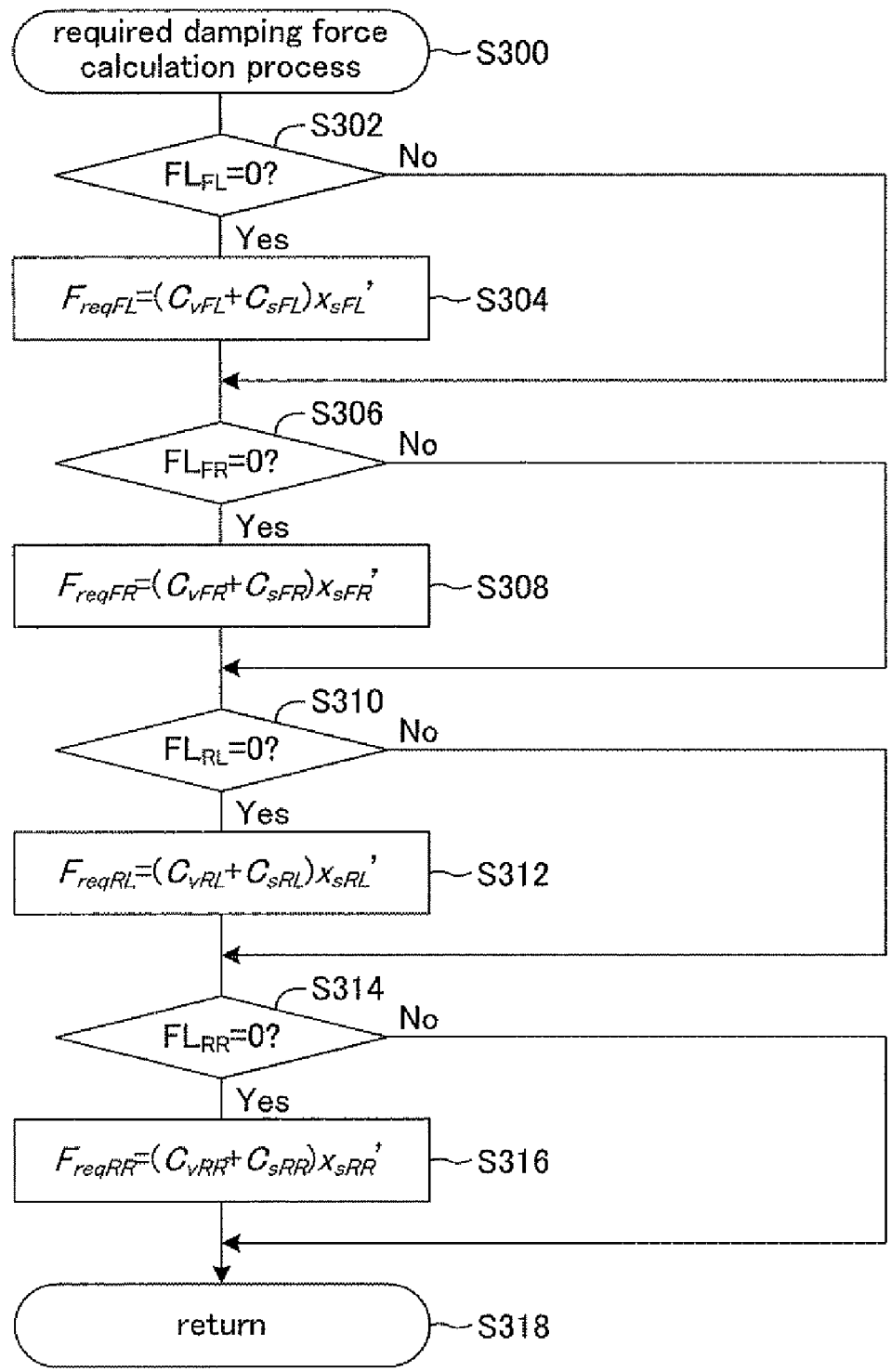
FIG. 6 is a flowchart showing a flow of a required damping force calculation program executed by the microcomputer according to the present embodiment.

The microcomputer 50 calculates the required damping forces at S300 of FIG. 3 after calculating the variable damping coefficients at S200 of FIG. 3. FIG. 6 is a flowchart showing a flow of a required damping force calculation program executed by the microcomputer 50 at S300. The microcomputer 50 starts the program at S300 of FIG. 6. Subsequently, at S302, the microcomputer 50 determines whether or not the control flag $FL_{FL}$ is set at 0. When the determination result is Yes, the microcomputer 50 proceeds to S304 to calculate the required damping force $F_{reqFL}$, which is a target damping force (a damping force as a control target) to be generated by the damper $20_{FL}$. The required damping force $F_{reqFL}$ is calculated by multiplying the sprung-member-unsprung-member-relative-speed $x_{sFL}'$ by the required damping coefficient $C_{reqFL}$ obtained by adding the variable damping coefficient $C_{vFL}$ to a linear damping coefficient $C_{sFL}$. The linear damping coefficient $C_{sFL}$ represents a constant component of the required damping coefficient $C_{reqFL}$ and is predetermined.

The microcomputer 50 proceeds to S306 after calculating the required damping force $F_{reqFL}$ at S304. When the determination result at S302 is No, that is, when the control flag $FL_{FL}$ is set at 1, the microcomputer 50 proceeds to S306, skipping S304.

At S306, the microcomputer 50 determines whether or not the control flag $FL_{FR}$ is set at 0. When the determination result is Yes, the microcomputer 50 proceeds to S308 to calculate the required damping force $F_{reqFR}$, which is a target damping force (a damping force as a control target) to be generated by the damper $20_{FR}$. The required damping force $F_{reqFR}$ is calculated by multiplying the sprung-member-unsprung-member-relative-speed $x_{sFR}'$ by the required damping coefficient $C_{reqFR}$ obtained by adding the variable damping coefficient $C_{vFR}$ to a linear damping coefficient $C_{sFR}$. The linear damping coefficient $C_{sFR}$ represents a constant component of the required damping coefficient $C_{reqFR}$ and is predetermined.

The microcomputer 50 proceeds to S310 after calculating the required damping force $F_{reqFR}$ at S308. When the determination result at S306 is No, that is, when the control flag $FL_{FR}$ is set at 1, the microcomputer 50 proceeds to S310, skipping S308.

At S310, the microcomputer 50 determines whether or not the control flag $FL_{RL}$ is set at 0. When the determination result is Yes, the microcomputer 50 proceeds to S312 to calculate the required damping force $F_{reqRL}$, which is a target damping force (a damping force as a control target) to be generated by the damper $20_{RL}$. The required damping force $F_{reqRL}$ is calculated by multiplying the sprung-member-unsprung-member-relative-speed $x_{sRL}'$ by the required damping coefficient $C_{reqRL}$ obtained by adding the variable damping coefficient $C_{vRL}$ to a linear damping coefficient $C_{sRL}$. The linear damping coefficient $C_{sRL}$ represents a constant component of the required damping coefficient $C_{reqRL}$ and is predetermined.

The microcomputer 50 proceeds to S314 after calculating the required damping force $F_{reqFL}$ at S312. When the determination result at S310 is No, that is, when the control flag $FL_{RL}$ is set at 1, the microcomputer 50 proceeds to S314, skipping S312.

At S314, the microcomputer 50 determines whether or not the control flag $FL_{RR}$ is set at 0. When the determination result is Yes, the microcomputer 50 proceeds to S316 to calculate the required damping force $F_{reqRR}$, which is a target damping force (a damping force as a control target) to be generated by the damper $20_{RR}$. The required damping force $F_{reqRR}$ is calculated by multiplying the sprung-member-unsprung-member-relative-speed $x_{sRR}'$ by the required damping coefficient $C_{reqRR}$ obtained by adding the variable damping coefficient $C_{vRR}$ to a linear damping coefficient $C_{sRR}$. The linear damping coefficient $C_{sRR}$ represents a constant component of the required damping coefficient $C_{reqRR}$ and is predetermined.

The microcomputer 50 proceeds to S318 to end the present program after calculating the required damping force $F_{reqRR}$ at S316, When the determination result at S314 is No, that is, when the control flag $FL_{RR}$ is set at 1, the microcomputer 50 proceeds to S318, skipping S316, to end the present program.

As understood from the flow of the processes described above, each of the required damping forces $F_{reqFL}$, $F_{reqFR}$, $F_{reqRL}$, and $F_{reqRR}$ is calculated using each of the variable damping coefficients $C_{vFL}$, $C_{vFR}$, $C_{vRL}$, and $C_{vRR}$ calculated according to the Nonlinear $H_\infty$ control theory, when each of the corresponding control flags $FL_{RL}$, $FL_{FR}$, $FL_{RL}$, and $FL_{RR}$ is set at 0, that is, when each corresponding product of the sum $x_b'$ of sprung member speeds and each of the sprung-member-unsprung-member-relative-speeds $x_{sFL}'$, $x_{sFR}'$, $x_{sRL}'$, and $x_{sRR}'$ is positive. The variable damping coefficient calculation processes shown in FIG. 5 and the required damping force calculation processes shown in FIG. 6 correspond to the required damping force calculation means of the present invention.

Figure 7:
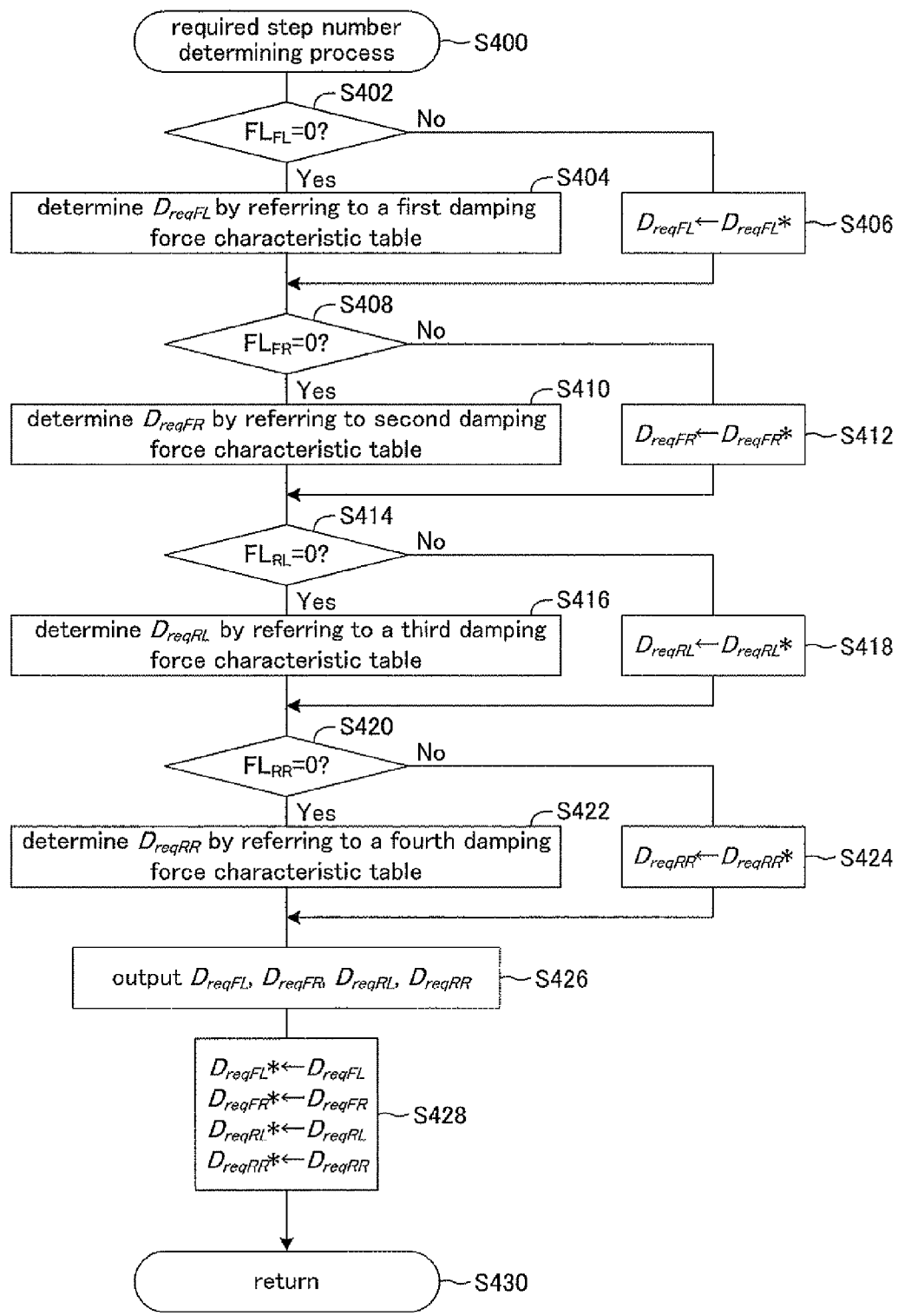
FIG. 7 is a flowchart showing a flow of a required step number determining program executed by the microcomputer according to the present embodiment.

The microcomputer 50 proceeds S400 of FIG. 3 to determine the required step numbers after calculating the required damping forces $F_{reqFL}$, $F_{reqFR}$, $F_{reqRL}$, and $F_{reqRR}$ at S300 of FIG. 3. FIG. 7 is a flowchart showing a flow of a required step number determining program executed by the microcomputer 50 at S400. The microcomputer 50 starts the program at S400 of FIG. 7. Subsequently, at S402, the microcomputer 50 determines whether or not the control flag $FL_{FL}$ is 0. When the determination result is Yes, the microcomputer 50 proceeds to S404 to determine the required step number $D_{reqFL}$, which is a control target step number for the damping force characteristic of the damper $20_{FL}$, by referring to a first damping force characteristic table.

The first damping force characteristic table is a table which relates a plurality of the sprung-member-unsprung-member-relative-speeds $x_{sFL}'$ to damping forces which the damper $20_{FL}$ can generate at each of the relative speeds $x_{sFL}'$, for each of step numbers representing the damping force characteristic. The first damping force characteristic table is stored in a memory of the microcomputer 50. At S404, the microcomputer 50 refers to the first damping force characteristic table to extract/obtain damping forces corresponding to the currently obtained sprung-member-unsprung-member-relative-speed $x_{sFL}'$ together with the step numbers for all step numbers. The microcomputer 50 determines, as the required step number $D_{reqFL}$, one of thus extructed step numbers whose damping force is closest to the required damping force $F_{reqFL}$.

When the determination result at S402 is No, that is, when the control flag $FL_{FL}$ is set at 1, the microcomputer 50 proceeds to S406. At S406, the microcomputer 50 sets the required step number $D_{reqFL}$ at the previous value $D_{reqFL}*$ of the required step number. The previous value $D_{reqFL}*$ of the required step number is a required step number which was determined at S404 or S406 in the previous process to determine the required step number. Accordingly, at S406, the required step number $D_{reqFL}$ is set so as to be equal to the required step number $D_{reqFL}$ determined in the previous process.

The microcomputer 50 proceeds to S408 to determine whether or not the control flag $FL_{FR}$ is set at 0, after determining the required step numbers $D_{reqFL}$ at S404 or S406. When the determination result is Yes, the microcomputer 50 proceeds to S410 to determine the required step number $D_{reqFR}'$ which is a control target step number for the damping force characteristic of the damper $20_{FR}$, by referring to a second damping force characteristic table.

The second damping force characteristic table is a table which relates a plurality of the sprung-member-unsprung-member-relative-speeds $x_{sFR}'$ to damping forces which the damper $20_{FR}$ can generate at each of the relative speeds $x_{sFR}'$ for each of step numbers representing the damping force characteristics. The second damping force characteristic table is also stored in the memory of the microcomputer 50. At S410, the microcomputer 50 refers to the second damping force characteristic table to extract/obtain damping forces corresponding to the currently obtained sprung-member-unsprung-member-relative-speed $x_{sFR}'$ together with the step numbers for all step numbers. The microcomputer 50 determines, as the required step number $D_{reqFR}$, one of thus extructed step numbers whose damping force is the closest to the required damping force $F_{reqFR}$.

When the determination result at S408 is No, that is, when the control flag $FL_{FR}$ is set at 1, the microcomputer 50 proceeds to S412. At S412, the microcomputer 50 sets the required step number $D_{reqFR}$ at the previous value $D_{reqFR}*$ of the required step number. The previous value $D_{reqFR}*$ of the required step number is a required step number which was determined at S410 or S412 in the previous process to determine the required step number. Accordingly, at S412, the required step number $D_{reqFR}$ is set so as to be equal to the required step number $D_{reqFR}$ determined in the previous process.

The microcomputer 50 proceeds to S414 to determine whether or not the control flag $FL_{RL}$ is set at 0, after determining the required step numbers $D_{reqFR}$ at S410 or S412. When the determination result is Yes, the microcomputer 50 proceeds to S416 to determine the required step number $D_{reqRL}$, which is a control target step number for the damping force characteristic of the damper $20_{RL}$, by referring to a third damping force characteristic table.

The third damping force characteristic table is a table which relates a plurality of the sprung-member-unsprung-member-relative-speeds $x_{sRL}'$ to damping forces which the damper $20_{RL}$ can generate at each of the relative speeds $x_{sRL}'$, for each of step numbers representing the damping force characteristic. The third damping force characteristic table is also stored in the memory of the microcomputer 50. At S416, the microcomputer 50 refers to the third damping force characteristic table to extract/obtain damping forces corresponding to the currently obtained sprung-member-unsprung-member-relative-speed $x_{sRL}'$ together with the step numbers for all step numbers. The microcomputer 50 determines, as the required step number $D_{reqRL}$, one of the thus extructed step numbers whose damping force is closest to the required damping force $F_{reqRL}$.

When the determination result at S414 is No, that is, when the control flag $FL_{RL}$ is set at 1, the microcomputer 50 proceeds to S418. At S418, the microcomputer 50 sets the required step number $D_{reqRL}$ at the previous value $D_{reqRL}*$ of the required step number. The previous value $D_{reqRL}*$ of the required step number is a required step number which was determined at S416 or S418 in the previous process to determine the required step number. Accordingly, at S418, the required step number $D_{reqRL}$ is set so as to be equal to the required step number $D_{reqRL}$ determined in the previous process.

The microcomputer 50 proceeds to S420 to determine whether or not the control flag $FL_{RR}$ is set at 0, after determining the required step numbers $D_{reqRL}$ at S416 or S418. When the determination result is Yes, the microcomputer 50 proceeds to S422 to determine the required step number $D_{reqRR}$, which is a control target step number for the damping force characteristic of the damper $20_{RR}$, by referring to a fourth damping force characteristic table.

The fourth damping force characteristic table is a table which relates a plurality of the sprung-member-unsprung-member-relative-speeds $x_{sRR}'$ to damping forces which the damper $20_{RR}$ can generate at each of the relative speeds for each of step numbers representing the damping force characteristic. The fourth damping force characteristic table is also stored in the memory of the microcomputer 50. At S422, the microcomputer 50 refers to the fourth damping force characteristic table to extract/obtain damping forces corresponding to the currently obtained sprung-member-unsprung-member-relative-speed $x_{sRR}'$ together with the step numbers for all step numbers. The microcomputer 50 determines, as the required step number $D_{reqRR}$, one of the thus extracted step numbers whose damping force is the closest to the required damping force $F_{reqRR}$.

When the determination result at S420 is No, that is, when the control flag $FL_{RR}$ is set at 1, the microcomputer 50 proceeds to S424. At S424, the microcomputer 50 sets the required step number $D_{reqRR}$ at the previous value $D_{reqRR}*$ of the required step number. The previous value $D_{reqRR}*$ of the required step number is a required step number which was determined at S422 or S424 in the previous process to determine the required step number. Accordingly, at S424, the required step number $D_{reqRR}$ is set so as to be equal to the required step number $D_{reqRR}$ determined in the previous process.

The microcomputer 50 proceeds to S426 to output the determined required step numbers $D_{reqFL}$, $D_{reqFR}$, $D_{reqRL}$, and $D_{reqRR}$, after determining the required step number $D_{reqRR}$ at S422 or S424. The output required step numbers $D_{reqFL}$, $D_{reqFR}$, $D_{reqRL}$, and $D_{reqRR}$ are input to the actuators $32_{FL}$, $32_{FR}$, $32_{RL}$, and $32_{RR}$, respectively. Each of the actuators operates so as to have the step number of the corresponding damper coincide with the corresponding required step number. Accordingly, the corresponding valves $31_{FL}$, $31_{FR}$, $31_{RL}$, and $31_{RR}$ are controlled. In this manner, the damping force characteristics of the damper $20_{FL}$, $20_{FR}$, $20_{RL}$, and $20_{RR}$ are controlled.

After the microcomputer 50 output the required step numbers at S426, it proceeds to S428 to store the required step numbers $D_{reqFL}$, $D_{reqFR}$, $D_{reqRL}$, and $D_{reqRR}$ into the previous values $D_{reqFL}*$, $D_{reqFR}*$, $D_{reqRL}*$, and $D_{reqRR}*$ of the required step numbers, respectively. Subsequently, the microcomputer 50 proceeds to S430 to end the present program. The processes at S404, S410, S416, and S422, and the process at S426 performed in response to these processes correspond to damping force characteristic determining means of the present invention. The processes at S406, S412, S418, and S424 correspond to operation prohibiting means of the present invention.

The microcomputer 50 ends the damping force control program after determining the required step numbers as described at S400 of FIG. 3. The damping force control program is executed every elapse of a short time period. Accordingly, the damping force characteristics of the damper $20_{FL}$, $20_{FR}$, $20_{RL}$, and $20_{RR}$ are continuously controlled.

As understood from the above description, in the present embodiment, when the control flag is set at 0, that is, when the product of the sum $x_b'$ of sprung member speeds and each of the sprung-member-unsprung-member-relative-speeds $x_s'$ ($x_{sFL}'$, $x_{sFR}'$, $x_{sRL}'$, $x_{sRR}'$) is positive, the required damping force $F_{req}$ ($F_{reqFL}$, $F_{reqFR}$, $F_{reqRL}$, $F_{reqRR}$) is calculated using the variable damping coefficient $C_v$ ($C_{vFL}$, $C_{vFR}$, $C_{vRL}$, $C_{vRR}$) calculated according to the Nonlinear $H_\infty$ control theory, and the required step number $D_{req}$ ($D_{reqFL}$, $D_{reqFR}$, $D_{reqRL}$, $D_{reqRR}$) is determined based on the calculated required damping force $F_{req}$. The step number representing damping force characteristic of the damper 20 ($20_{FL}$, $20_{FR}$, $20_{RL}$, $20_{RR}$) is variably controlled based on the required step number $D_{req}$. Further, as understood from the formulas described above, the variable damping coefficient $C_v$ varies depending on the state variables representing the vibration state of the sprung member HA. Consequently, by means of the variable control described above, the operation of the variable throttle mechanism 30 ($30_{FL}$, $30_{FR}$, $30_{RL}$, $30_{RR}$) is controlled in such a manner that the damping force characteristic (the step number) of the damper 20 changes according to the vibration state of the sprung member HA.

On the other hand, when the control flag is set at 1, that is, when the product of the sum $x_b'$ of sprung member speeds and the sprung-member-unsprung-member-relative-speed $x_s'$ is negative (or equal to 0), the required step number $D_{req}$ is set/kept at the previous value $D_{req}*$ of the required step number. Accordingly, the step number representing damping force characteristic of the damper 20 is fixed, and the operation of the variable throttle mechanism 30 is prohibited. In the present embodiment, such a control for fixing the step number is referred to as operation prohibiting control.

When the product of the sum $x_b'$ of sprung member speeds and the sprung-member-unsprung-member-relative-speed $x_s'$ is positive, it is unlikely for the vibration in the middle/high frequency range to be input to the suspension apparatus SP ($SP_{FL}$, $SP_{FR}$, $SP_{RL}$, $SP_{RR}$). To the contrary, when the product of the sum $x_b'$ of sprung member speeds and the sprung-member-unsprung-member-relative-speed $x_s'$ is negative, it is likely for the vibration in the middle/high frequency range to be input to the suspension apparatus SP. Consequently, according to the present embodiment, the damping force characteristic of the damper 20 is variably controlled based on the Nonlinear $H_\infty$ control theory when the vibration in the middle/high frequency range is not being input to the suspension apparatus SP, and the damping force characteristic is fixed when the vibration in the middle/high frequency range is being input to the suspension apparatus SP.

The reason why it is possible to determine whether or not the vibration in the middle/high frequency range is being input to the suspension apparatus SP, based on whether the product of the sum $x_b'$ of sprung member speeds and the sprung-member-unsprung-member-relative-speed $x_s'$ is positive or negative is described as follows.

Figure 8:
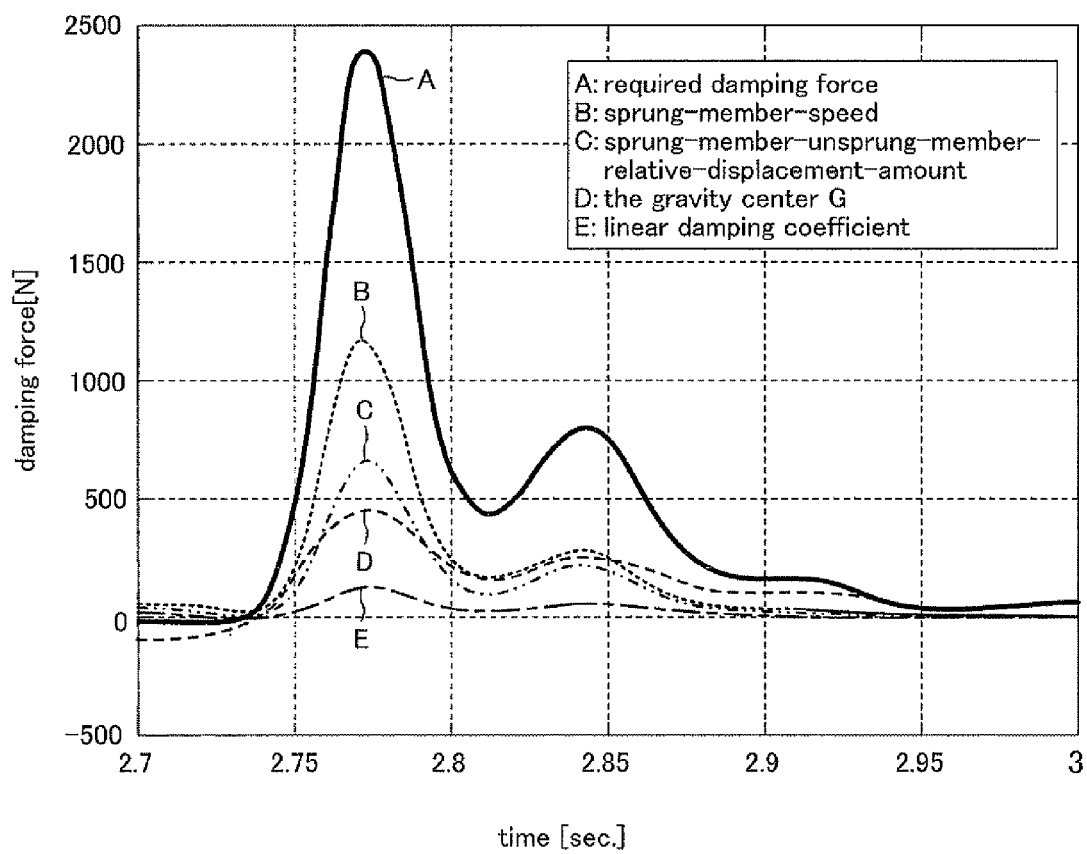
FIG. 8 is a graph showing a required damping force calculated according to the Nonlinear $H_\infty$ control theory with respect to time.

FIG. 8 is a graph showing the required damping force $F_{req}$ calculated according to the Nonlinear $H_\infty$ control theory with respect to time. The axis of abscissas of the graph is an elapsed time [sec.], and the axis of ordinate of the graph is a damping force [N]. A graph A shown by a solid line in FIG. 8 shows a temporal variation of the required damping force $F_{req}$. Graphs B, C, D, and E, shown by dashed lines in FIG. 8, show temporal variations of breakdowns of the required damping force $F_{req}$, the breakdowns being classified based on or for main internal factors. The graph B shows a temporal variation of a partial damping force of the required damping force $F_{req}$, the partial damping force relating to the sprung member speed of the sprung member HA at a supporting position by each of the suspension apparatuses SP. The graph C shows a temporal variation of a partial damping force of the required damping force $F_{req}$, the partial damping force relating to the sprung-member-unsprung-member-relative-displacement-amount of each of the suspension apparatuses SP. The graph D shows a temporal variation of a partial damping force of the required damping force $F_{req}$, the partial damping force relating to the gravity center of the sprung member HA. The graph E shows a temporal variation of a partial damping force of the required damping force $F_{req}$, the partial damping force calculated based on the linear damping coefficient (linear damping force).

As understood from FIG. 8, the factor which most greatly affects the required damping force $F_{req}$ is the sprung member speed, as shown by the graph B. A temporal variation of the sum $x_b'$ of sprung member speeds which is the summation of each of the sprung member speeds is therefore similar to the temporal variation of the required damping force $F_{req}$. Accordingly, it is likely that the required damping force $F_{req}$ is positive when the sum $x_b'$ of sprung member speeds is positive, and that the required damping force $F_{req}$ is negative when the sum $x_b'$ of sprung member speeds is negative. That is, it is likely that whether the sum of sprung member speeds is positive or negative coincides with whether the required damping force $F_{req}$ is positive or negative.

Figure 9:
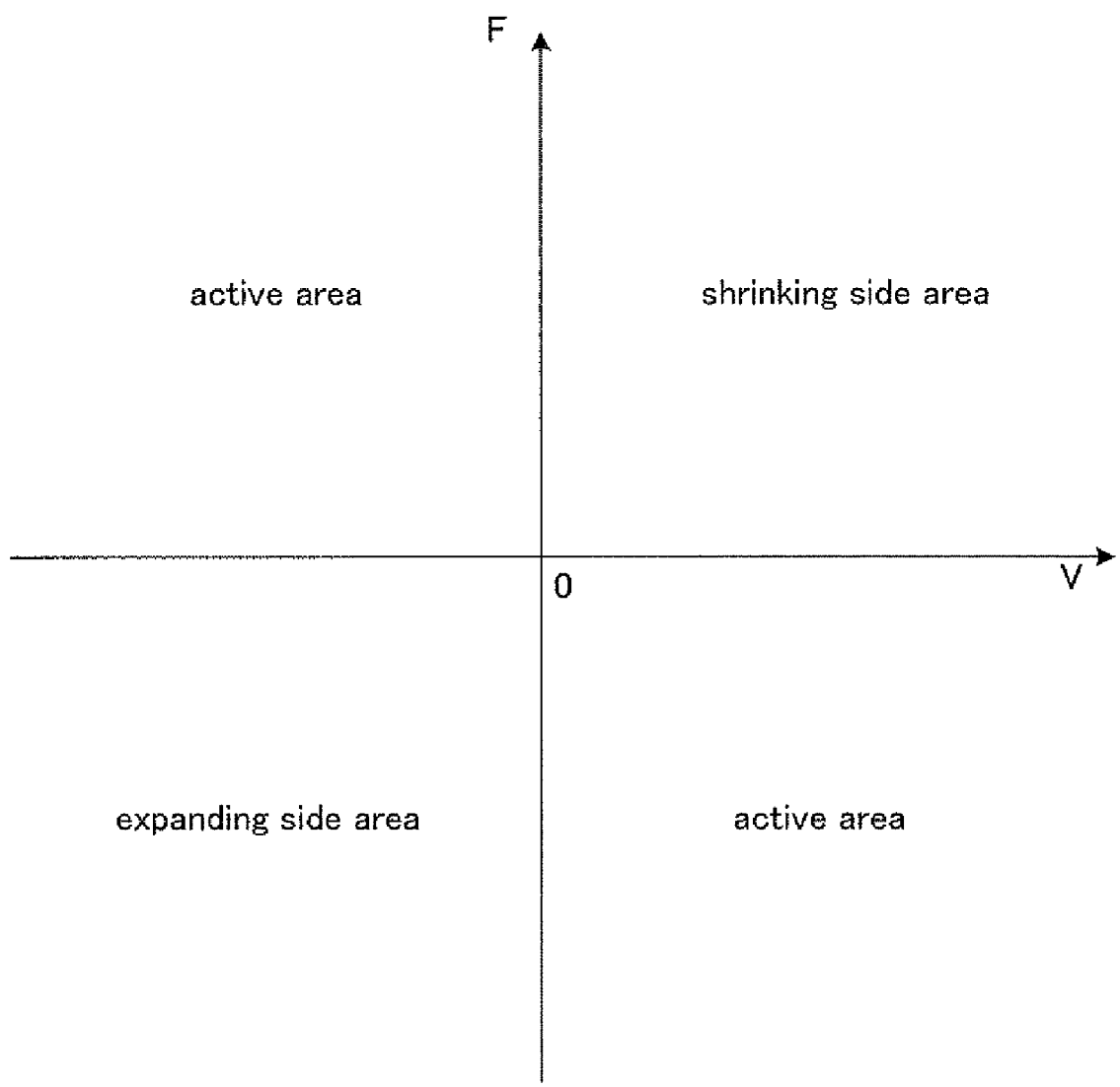
FIG. 9 is a damping force characteristic map representing a relation between a damping force and a sprung-member-unsprung-member-relative-speed.

FIG. 9 is a damping force characteristic map (F-V map) representing a relation between the damping force and the sprung-member-unsprung-member-relative-speed. The axis of abscissas of the F-V map is the sprung-member-unsprung-member-relative-speed V ($=x_s'$), and the axis of ordinate of the F-V map is the damping force F. Concerning whether the damping force is positive or negative, for example, the damping force to suppress a shrinkage (compression) of the damper 20 is a positive damping force, and the damping force to suppress an expansion of the damper 20 is a negative damping force. An area in the first quadrant of the F-V map is an area where the sprung-member-unsprung-member-relative-speed $x_s'$ is positive and the damping force is positive. When the required damping force $F_{req}$ varies within the area in the first quadrant of the F-V map, the product of the required damping force $F_{req}$ and the sprung-member-unsprung-member-relative-speed $x_s'$ is positive. Further, an area in the third quadrant is an area where the sprung-member-unsprung-member-relative-speed $x_s'$ is negative and the damping force is negative. When the required damping force $F_{req}$ varies within the area in the third quadrant of the F-V map, the product of the required damping force $F_{req}$ and the sprung-member-unsprung-member-relative-speed $x_s'$ is positive.

In the present specification, the area in the first quadrant is referred to as a shrinking side area, and the area in the third quadrant is referred to as an expanding side area. When the damping force varies within the shrinking side area, the damping force operates so as to suppress the shrinkage of the damper 20 caused by decrease in the distance between the sprung member HA and the unsprung members LA (LA$_{FL}$, LA$_{FR}$, LA$_{RL}$, LA$_{RR}$). This can suppress/damp a vibration in the direction of the shrinkage of the damper 20. When the damping force varies within the expanding side area, the damping force operates so as to suppress the expansion of the damper 20 caused by increase in the distance between the sprung member HA and the unsprung members LA. This can suppress/damp a vibration in the direction of the expansion of the damper 20.

In a case where the damping force for a vibration in proximity to a resonance frequency of the sprung member is controlled according to the Nonlinear $H_\infty$ control theory, the required damping force $F_{req}$ varies within the shrinking side area and the expanding side area of the F-V map, when the vibration in the middle/high frequency range is not being input. That is, when the vibration in the middle/high frequency range is not being input, the product of the required damping force $F_{req}$ and the sprung-member-unsprung-member-relative-speed $x_s'$ is positive. Further, as described above, it is likely that whether the required damping force $F_{req}$ is positive or negative coincides with whether the sum $x_b'$ of sprung member speeds is positive or negative. Accordingly, it is likely that the product of the required damping force $F_{req}$ and the sprung-member-unsprung-member-relative-speed $x_s'$ is also positive, when the product of the sum $x_b'$ of sprung member speeds and the sprung-member-unsprung-member-relative-speed $x_s'$ is positive. In view of the above, it is inferred that it is likely that the vibration in the middle/high frequency range is not being input, when the product of the sum $x_b'$ of sprung member speeds and the sprung-member-unsprung-member-relative-speed $x_s'$ is positive.

An area in the second quadrant of the F-V map is an area where the sprung-member-unsprung-member-relative-speed $x_s'$ is negative and the damping force is positive. Accordingly, when the required damping force $F_{req}$ varies within the second quadrant, the product of the required damping force $F_{req}$ and the sprung-member-unsprung-member-relative-speed $x_s'$ is negative. Further, an area in the fourth quadrant is an area where the sprung-member-unsprung-member-relative-speed $x_s'$ is positive and the damping force is negative. Accordingly, when the required damping force $F_{req}$ varies within the fourth quadrant, the product of the required damping force $F_{req}$ and the sprung-member-unsprung-member-relative-speed $x_s'$ is negative.

When the damping force varies within the second quadrant, the damping force operates so as to help/prompt the expansion of the damper 20 caused by increase in the distance between the sprung member HA and the unsprung member LA. That is, the expansion of the damper 20 is urged by the damping force. Further, when the damping force varies within the fourth quadrant, the damping force operates so as to help/prompt the shrinkage of the damper 20 caused by decrease in the distance between the sprung member HA and the unsprung member LA. That is, the shrinkage of the damper 20 is urged by the damping force. In the present specification, the area in the second quadrant and the area in the fourth quadrant are referred to as an active area.

In a case where the damping force for the vibration in proximity to the resonance frequency of the sprung member is controlled according to the Nonlinear $H_\infty$ control theory, the required damping force $F_{req}$ may vary within the active area when the vibration in the middle/high frequency range is being input. Further, as described above, it is likely that whether the required damping force $F_{req}$ is positive or negative coincides with whether the sum $x_b'$ of sprung member speeds is positive or negative. Accordingly, it is likely that the product of the required damping force $F_{req}$ and the sprung-member-unsprung-member-relative-speed $x_s'$ is negative, when the product of the sum $x_b'$ of sprung member speeds and the sprung-member-unsprung-member-relative-speed $x_s'$ is negative. In view of the above, it is inferred that it is likely that the vibration in the middle/high frequency range is being input, when the product of the sum $x_b'$ of sprung member speeds and the sprung-member-unsprung-member-relative-speed $x_s'$ is negative.

As described above, according to the present embodiment, when the product of the sum $x_b'$ of sprung member speeds and the sprung-member-unsprung-member-relative-speed $x_s'$ is positive, that is, when the vibration in the middle/high frequency range is not being input, the required damping force $F_{req}$ is calculated based on the Nonlinear $H_\infty$ control theory, and thereby the operation of the variable throttle mechanism 30 is controlled in such a manner that the damping force characteristic of the damper 20 varies depending on the vibration state of the sprung member HA. This allows the damping force characteristic to be controlled so as to improve the comfortability in riding (ride comfort) of the vehicle. In addition, when the product of the sum $x_b'$ of sprung member speeds and the sprung-member-unsprung-member-relative-speed $x_s'$ is negative, that is, when the vibration in the middle/high frequency range is being input, the operation of the variable throttle mechanism 30 is prohibited/stopped. This allows the damping force characteristic to be kept unchanged. Such an operation prohibiting control suppresses/avoids the increase in the operation frequency of or in the operation amount of the variable throttle mechanism 30, and thereby, the durability of the valves 31 ($31_{FL}$, $31_{FR}$, $31_{RL}$, $31_{RR}$) and the actuators 32 ($32_{FL}$, $32_{FR}$, $32_{RL}$, $32_{RR}$) constituting the variable throttle mechanism 30 is improved. Furthermore, since the damping force characteristic of the damper 20 is fixed (kept unchanged) when it is inferred that the vibration in the middle/high frequency range is being input, further degrading of the comfortability in riding of the vehicle is avoided.

Figure 10:
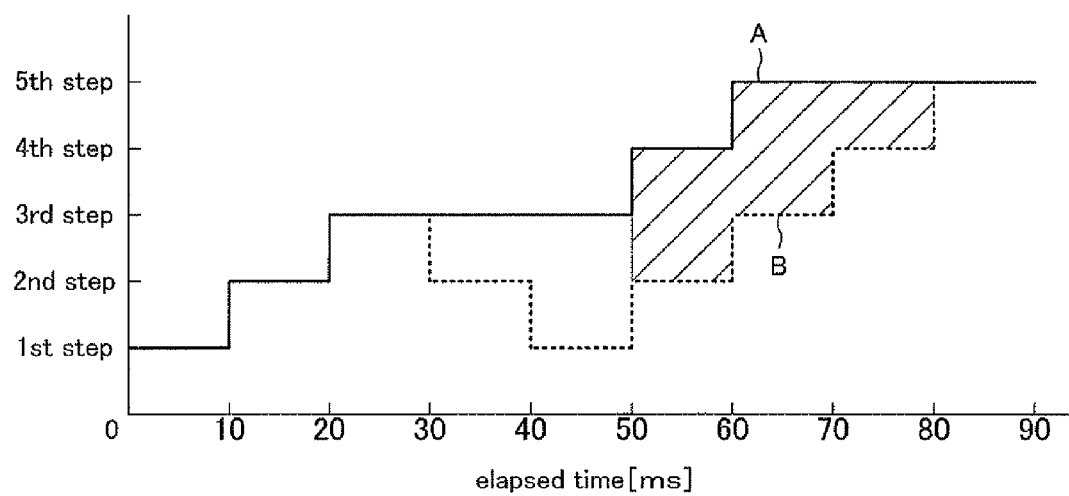
FIG. 10 is a graph showing change in the step number (step) with respect to time, the step number representing the damping force characteristic of the damper varying according to an operation of a variable throttle mechanism.

FIG. 10 is a graph showing a change in the step number representing the damping force characteristic of the damper 20 caused by operating the variable throttle mechanism 30 (the actuators 32 and the valves 31). The axis of abscissas of the graph is an elapsed time [sec.], and the axis of ordinate of the graph is the step number. As shown in FIG. 10, the step number is varied from a 1st step to 5th step. 1st step represents a damping force characteristic which generates the lowest damping force. 5th step represents a damping force characteristic which generates the highest damping force. The damping force increases as the step number increases. A graph A shown by a solid line shows a change in the step number over time, the step number obtained according to the damping force control of the present embodiment. A graph B shown by a dashed line shows a change in the step number over time, the step number obtained according to the conventional damping force control.

In a period of 0 to 30 ms of elapsed time, the vibration in the middle/high frequency range is not input. That is, in the period described above, the product of the sum $x_b'$ of sprung member speeds and the sprung-member-unsprung-member-relative-speed $x_s'$ is positive. Accordingly, the control mode for the damping force characteristic of the damper 20 is the variable control. In this period, both the step number shown by the graph A and the step number shown by the graph B change in the same fashion. The step number at the 30 ms of elapsed time is 3 (3rd step).

In a period of 30 to 50 ms of elapsed time, the vibration in the middle/high frequency range is input. That is, in that period, the product of the sum $x_b'$ of sprung member speeds and the sprung-member-unsprung-member-relative-speed $x_s'$ is negative. According to the conventional control (the graph B), the control mode for the damping force characteristic is changed from the variable control to the low damping force fixing control after the 30 ms of elapsed time. The step number is therefore changed from the 3rd to the 1st. If an actuation response time is 10 ms/one step, the step number decreases by one step number per 10 ms, from the 30 ms of elapsed time, and reaches the 1st at the 50 ms of elapsed time. On the other hand, the control according to the present embodiment (graph A), the control mode for the damping force characteristic is changed from the variable control to the operation prohibiting control. During the operation prohibiting control, the required damping force $F_{req}$ is set to be equal to the required step number $D_{req}*$ which was determined in the previous process to determine the required step number. The step number is therefore fixed to the 3rd which is the required step number just (immediately) before the change of the control mode. In this manner, in the present embodiment, the step number does not change when the control mode changes from the variable control to the operation prohibiting control. That is, the variable throttle mechanism 30 does not operate when the control mode changes from the variable control to the operation prohibiting control. This can suppress the increase in the operation frequency of or in the operation amount of the variable throttle mechanism 30.

In a period after 50 ms of elapsed time, the vibration in the middle/high frequency range is not input. That is, in that period, the product of the sum $x_b'$ of sprung member speeds and the sprung-member-unsprung-member-relative-speed $x_s'$ is positive. Accordingly, the variable control is resumed in the conventional control (graph B) as well as in the control according to the present embodiment (graph A), at the 50 ms of elapsed time. According to the conventional control (graph B), the step number is 1st at the 50 ms of elapsed time. Consequently, if the required step number $D_{req}$ calculated based on the variable control is 5th, it takes a long time for the step number to reach the required step number $D_{req}$. In addition, the damping force is insufficient until the step number reaches the required step number $D_{req}$. On the other hand, according to the control of the present embodiment (graph A), the step number just before the operation prohibiting control is the same with the step number just after the operation prohibiting control. The step number is thus already 3rd at the 50 ms of elapsed time. Accordingly, even if the required step number $D_{req}$ calculated when the variable control is resumed is 5th, the step number can quickly reach the required step number $D_{req}$. In addition, since it takes a short time for the step number to reach the required step number $D_{req}$, a period in which the damping force is insufficient is short. This can avoids a shortage in the damping force by the damping force shown by a hatching in the FIG. 10.

Moreover, in the conventional control (graph B), the step number after the 30 ms of elapsed time changes like 3rd→2nd→1st→2nd→3rd→4th→5th. The number of change in the step number is six. On the other hand, in the control of the present embodiment (graph A), the step number after the 30 ms of elapsed time changes like 3rd→4th→5th. The number of change in the step number is two. In this manner, according to the present embodiment, the number of changing over (i.e., the operation amount) by the variable throttle mechanism 30 due to the change of the control mode is smaller compared to the conventional control. This improves the durability of the valve 31 and the actuator 32 constituting the variable throttle mechanism 30.

As described above, according to the present embodiment, the control mode is set to be the variable control when the product of the sum $x_b'$ of sprung member speeds and the sprung-member-unsprung-member-relative-speed $x_s'$ is positive. Consequently, when the vibration in the middle/high frequency range is not being input to the suspension apparatus SP, the operation of the variable throttle mechanism 30 is controlled in such a manner that the damping force characteristics varies in accordance with the vibration state of the sprung member HA based on the Nonlinear $H_\infty$ control theory. Further, according to the present embodiment, the control mode is set to be the operation prohibiting control when the product of the sum $x_b'$ of sprung member speeds and the sprung-member-unsprung-member-relative-speed $x_s'$ is negative. Consequently, when the vibration in the middle/high frequency range is being input to the suspension apparatus SP, the operation (the changing over) of the variable throttle mechanism 30 is prohibited. This avoids the increase in the operation frequency of or in the operation amount of the variable throttle mechanism 30. Accordingly, the durability of the variable throttle mechanism 30 is improved.

Furthermore, when the variable control is resumed after the operation prohibiting control, the damping force characteristic is equal to the damping force characteristic which was variably controlled just (immediately) before the operation prohibiting control. Accordingly, it is possible to suppress/avoid the increase in the operation amount of the variable throttle mechanism 30 during a period from the timing when the variable control is resumed to the timing when the damping force characteristic reaches the desired characteristic. Consequently, the durability of the variable throttle control mechanism 30 is improved. Moreover, since the damping force characteristic can quickly reach the desired damping force characteristic after the variable control is resumed, a delay of the control is short. Further, an insufficiency of the damping force due to the delay of the control can be avoided.

Further, when the control mode is the operation prohibiting control, the required step number, which is the control target step number of the step number representing the damping force characteristic, is set to the same step number as the step number determined in the previous required step number determining process. By such a simple control, the operation of the variable throttle mechanism 30 is prohibited.

The invention claimed is:

1. A damping force control apparatus, applied to a plurality of suspension apparatuses, each having a spring and a damper and interposed between a sprung member and an unsprung member to support the sprung member, for controlling a damping force characteristic of the damper comprising:

damping force characteristic changing means for changing said damping force characteristic of each of the dampers;

sprung-member-unsprung-member-relative-speed obtaining means for obtaining a sprung-member-unsprung-member-relative-speeds, each representing a vibration speed of each of said suspension apparatuses in a vertical direction, said sprung-member-unsprung-member-relative-speed being defined as a positive relative speed when a distance between said sprung member and said unsprung member is decreasing in a case where a sprung member speed which is a speed of said sprung member moving in an upper direction is defined to be positive, and said sprung-member-unsprung-member-relative-speed being defined as a positive relative speed when said distance between said sprung member and said unsprung member is increasing in a case where a speed of said sprung member moving in a lower direction is defined to be positive;

sum of sprung member speeds obtaining means for obtaining a sum of sprung member speeds which is a summation of each speed of said sprung member in the vertical direction at a position at which said sprung member is supported by each of said plurality of suspension apparatuses;

positive-negative determining means for determining whether a product of said sum of sprung member speeds and each of said sprung-member-unsprung-member-relative-speeds is positive or negative;

damping force characteristic control means for controlling an operation of said damping force characteristic changing means in such a manner that said damping force characteristic of each of said dampers is changed according to a vibration state of said sprung member when it is determined that each of said products is positive by said positive-negative determining means; and operation prohibiting means for prohibiting an operation of said damping force characteristic changing means when it is determined that each of said products is negative by said positive-negative determining means.

2. The damping force control apparatus according to claim 1, wherein said damping force characteristic control means comprises:

required damping force calculation means for calculating each of required damping forces, as a control target damping force, to be generated by each of said dampers of said suspension apparatuses based on a Nonlinear H∞ control theory; and damping force characteristic determining means for determining a damping force characteristic of each of said dampers based on each of said required damping forces calculated by said required damping force calculation means, and for outputting to said damping force characteristic changing means a signal corresponding to said determined damping force characteristic.

3. The damping force control apparatus according to claim 1, wherein said operation prohibiting means prohibits the operation of said damping force characteristic changing means by determining a target characteristic of said damping force characteristic of said damper to a target characteristic which is the same as one that was determined in a previous process.

4. The damping force control apparatus according to claim 1, wherein said damping force characteristic changing means comprises:

a valve member, provided to said damper, which operates to change said damping force characteristic; and an actuator, connected to said valve member, which actuates said valve member.

5. The damping force control apparatus according to claim 1, wherein said damping force characteristic changing means changes said damping force characteristic in a stepwise fashion.

6. The damping force control apparatus according to claim 2, wherein said operation prohibiting means prohibits the operation of said damping force characteristic changing means by determining a target characteristic of said damping force characteristic of said damper to a target characteristic which is the same as one that was determined in a previous process.

7. The damping force control apparatus according to claim 2, wherein said damping force characteristic changing means comprises:

a valve member, provided to said damper, which operates to change said damping force characteristic; and an actuator, connected to said valve member, which actuates said valve member.

8. The damping force control apparatus according to claim 3, wherein said damping force characteristic changing means comprises:

a valve member, provided to said damper, which operates to change said damping force characteristic; and an actuator, connected to said valve member, which actuates said valve member.

9. The damping force control apparatus according to claim 6, wherein said damping force characteristic changing means comprises:
- a valve member, provided to said damper, which operates to change said damping force characteristic; and
- an actuator, connected to said valve member, which actuates said valve member.

10. The damping force control apparatus according to claim 2, wherein said damping force characteristic changing means changes said damping force characteristic in a stepwise fashion.

11. The damping force control apparatus according to claim 3, wherein said damping force characteristic changing means changes said damping force characteristic in a stepwise fashion.

12. The damping force control apparatus according to claim 6, wherein said damping force characteristic changing means changes said damping force characteristic in a stepwise fashion.

13. The damping force control apparatus according to claim 4, wherein said damping force characteristic changing means changes said damping force characteristic in a stepwise fashion.

14. The damping force control apparatus according to claim 7, wherein said damping force characteristic changing means changes said damping force characteristic in a stepwise fashion.

15. The damping force control apparatus according to claim 8, wherein said damping force characteristic changing means changes said damping force characteristic in a stepwise fashion.

16. The damping force control apparatus according to claim 9, wherein said damping force characteristic changing means changes said damping force characteristic in a stepwise fashion.

* * * * *